(12) United States Patent
Tseng et al.

(10) Patent No.: US 11,974,356 B2
(45) Date of Patent: Apr. 30, 2024

(54) METHOD FOR MAINTAINING MULTI-SIM CONFIGURATION AND USER EQUIPMENT

(71) Applicant: FG Innovation Company Limited, New Territories (HK)

(72) Inventors: Yung-Lan Tseng, Taipei (TW); Mei-Ju Shih, Taipei (TW); Hung-Chen Chen, Taipei (TW)

(73) Assignee: FG Innovation Company Limited, New Territories (HK)

(*) Notice: Subject to any disclaimer, the term of this patent is extended or adjusted under 35 U.S.C. 154(b) by 0 days.

(21) Appl. No.: 17/564,169

(22) Filed: Dec. 28, 2021

(65) Prior Publication Data

US 2022/0210632 A1    Jun. 30, 2022

Related U.S. Application Data

(60) Provisional application No. 63/131,462, filed on Dec. 29, 2020.

(51) Int. Cl.
*H04W 8/18* (2009.01)
*H04W 88/06* (2009.01)

(52) U.S. Cl.
CPC .............. *H04W 8/18* (2013.01); *H04W 88/06* (2013.01)

(58) Field of Classification Search
CPC ................................ H04W 8/18; H04W 88/06
USPC ......................................................... 455/418
See application file for complete search history.

(56) References Cited

U.S. PATENT DOCUMENTS

| 2013/0023275 A1 | 1/2013 | Mutya et al. |
| 2020/0196375 A1 | 6/2020 | Ryu et al. |

FOREIGN PATENT DOCUMENTS

| CN | 106604340 | | 4/2017 | |
| CN | 109691219 | | 4/2019 | |
| CN | 113924793 A | * | 1/2022 | ............ H04W 8/183 |
| WO | WO-2016004559 A1 | * | 1/2016 | ............ H04W 48/12 |
| WO | 2020191333 | | 9/2020 | |
| WO | WO-2021223096 A1 | * | 11/2021 | |
| WO | WO-2022130273 A1 | * | 6/2022 | |

OTHER PUBLICATIONS

"International Search Report (Form PCT/ISA/210) of Related International PCT Application, application No. PCT/CN2021/142422," dated Mar. 29, 2022, pp. 1-4.

* cited by examiner

*Primary Examiner* — Ahmad F. Matar
*Assistant Examiner* — Jirapon Tulop
(74) *Attorney, Agent, or Firm* — JCIPRNET

(57) ABSTRACT

The embodiments of the disclosure provide a method for maintaining multi-SIM (Subscriber Identity Module) configuration and user equipment (UE). The method includes: receiving, by the UE, a first multi-SIM support information from a first cell, wherein the first multi-SIM support information is generated and transmitted from a second cell to the first cell via an inter-node signaling from the second cell to the first cell, and the first cell and the second cell belong to a first network; transmitting, by the UE, a multi-SIM assistance information message to the second cell, wherein the multi-SIM assistance information message is determined based on the first multi-SIM support information.

25 Claims, 4 Drawing Sheets

METHOD FOR MAINTAINING MULTI-SIM CONFIGURATION AND USER EQUIPMENT

CROSS-REFERENCE TO RELATED APPLICATION

The present application claims the benefit of and priority to U.S. Provisional Patent Application Ser. No. 63/131,462, filed on Dec. 29, 2020, entitled "MULTI-SIM OPERATIONS WITH RADIO ACCESS NETWORK SHARING" with, the content of which is hereby incorporated fully by reference herein into the present disclosure.

BACKGROUND

1. Field of the Invention

The present disclosure generally relates to a multi-SIM (Subscriber Identity Module) communication mechanism, in particular, to a method for maintaining multi-SIM configuration and user equipment (UE).

2. Description of Related Art

One Radio Access Network (RAN) is composed by at least one base station in the environment. One base station may configure one or more cells to operate in one or more frequencies. One cell may be considered as one logical entity configured to support different UEs (e.g., UE is registered with different service operators, UEs with different radio access technologies (RATs) such as E-UTRA (Evolved Universal Terrestrial Radio Access) or New Radio (NR)) on one or more frequency carriers (e.g., the frequency carriers may be indicated by NR-ARFCN (Absolute Radio Frequency Channel Number) or E-UTRA-ARFCN).

In addition, the base stations would broadcast the Cell Global Identifier (CGI) (e.g., ECGI of E-UTRA or NCGI of NR) for UEs to identify each cell configured by the base station. In one embodiment, one CGI may be composed by one Network Identity (e.g., PLMN-Identity) and one cell identity (e.g., one unique identity to identify different cells belonging to the same network, such as in one PLMN) and one optionally tracking area code (TAC). Moreover, one cell (or one base station) may be configured to be shared by different networks, which may be public networks and/or non-public networks.

In some embodiments, one UE, which is embedded with more than one (Physical/virtual) Universal Subscriber Identity Module (USIM), may not be able to connect with more than one networks simultaneously due to hardware limitations, even though the upper layers (e.g., application layer in the UE side) may require the UE to exchange data with more than one networks (e.g., Core Network (CN) and/or Radio Access Network (RAN)).

See FIG. 1, which shows a schematic diagram of UE having two USIMs. In FIG. 1, one UE may be embedded with both USIM-A and USIM-B, which enables the UE to perform Multi-SIM operations. In particular, the USIM-A may be associated with Network A (referred to as NW_A hereinafter), so the UE could register with the NW_A based on the information stored in the USIM A. Similarly, the USIM-B may be associated with Network B (referred to as NW_B hereinafter), so the UE could register with the NW_B based on the information stored in the USIM B.

In FIG. 1, when the UE is in a radio resource control (RRC) connected state with the NW_A by using the USIM-A, the UE can be in a RRC idle/inactive state with the NW_B at the same time.

In some cases, the UE may move (or connect) to NW_B in (at least) one of the following cases (but not be limited by the enlisted cases). Case 1: UE wants to monitor & response paging (e.g., paging downlink control information (DCI), short message, or paging message) from NW_B (associated USIM-B). Here, the paging message may include RAN paging message or CN paging message. Case 2: UE will originate the service via NW_B (e.g., UE may originate a voice call such as VoLTE (voice over long term evolution) or VoNR (voice over new radio) via NW_B). Case 3: UE receives updated system information from NW_B. Case 4: UE monitors paging Downlink Control Information (DCI) and/or receive paging message. Case 5: UE performs idle/inactive (Radio Resource Management/Radio Link Management) measurement(s) for cell reselection. Case 6: UE performs Mobile Originated (MO) signaling for some purposes, e.g., registration/Tracking Area Update (TAU), check paging cause, send busy indication, and RAN notification area update (RNAU).

As mentioned in the above, the UE may not be able to connect with more than one networks simultaneously due to hardware limitations. Therefore, it is crucial to design a mechanism for fulfilling the requirement of the UE to exchange packets with more than one NW with limited hardware.

SUMMARY OF THE INVENTION

Accordingly, the disclosure is directed to a method for maintaining multi-SIM configuration and UE, which may be used to solve the above technical problems.

The embodiments of the disclosure provide a method for maintaining multi-SIM (Subscriber Identity Module) configuration, adapted to user equipment (UE). The method includes: receiving, by the UE, a first multi-SIM support information from a first cell, wherein the first multi-SIM support information is generated and transmitted from a second cell to the first cell via an inter-node signaling from the second cell to the first cell, and the first cell and the second cell belong to a first network; transmitting, by the UE, a multi-SIM assistance information message to the second cell, wherein the multi-SIM assistance information message is determined based on the first multi-SIM support information.

The embodiments of the disclosure provide user equipment including a transceiver and a processor. The processor is coupled to the transceiver and configured to perform: controlling the transceiver to receive a first multi-SIM support information from a first cell, wherein the first multi-SIM support information is generated and transmitted from a second cell to the first cell via an inter-node signaling from the second cell to the first cell, and the first cell and the second cell belong to a first network; and controlling the transceiver to transmit a multi-SIM assistance information message to the second cell, wherein the multi-SIM assistance information message is determined based on the first multi-SIM support information.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
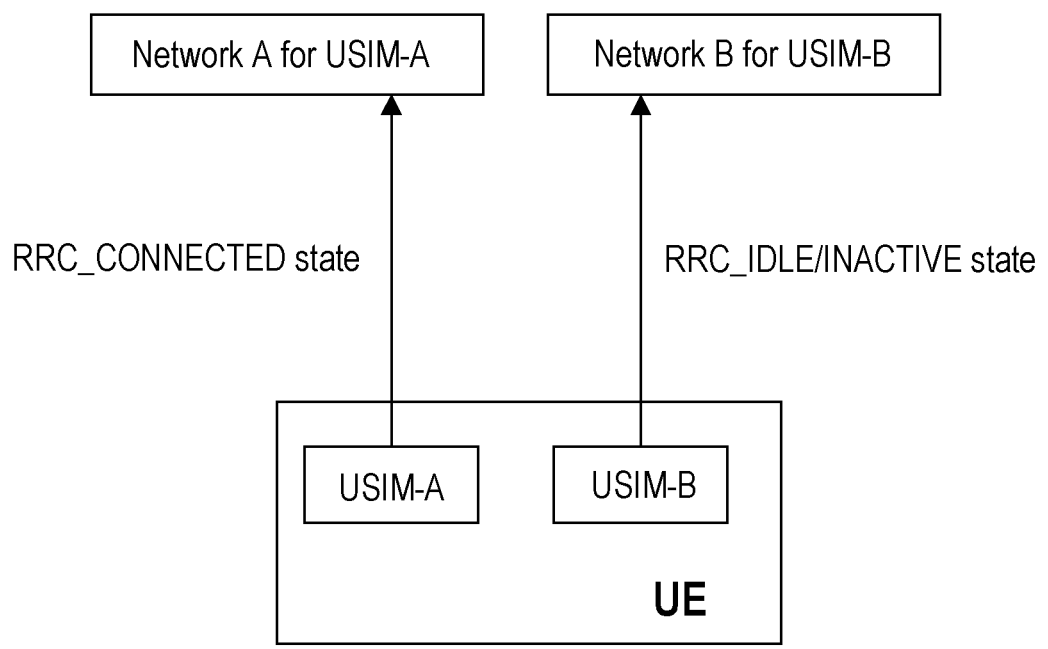
FIG. 1 shows a schematic diagram of UE having two USIMs.

Reference will now be made in detail to the present preferred embodiments of the invention, examples of which are illustrated in the accompanying drawings. Wherever possible, the same reference numbers are used in the drawings and the description to refer to the same or like parts.

In some conditions, not all of the networks (NWs) supported by the base station would support all of the new functionalities designed for Multi-SIM operations. In addition, to one NW (e.g., Public Land Mobile Network (PLMN) or private networks/non-public networks), it is possible that the NW may support one or more than one core network types (e.g., EPC (Evolved Packet Core) and/or 5GC (5G Core)). Different Core Networks (associated with the same PLMN/Private Network) may or may not support the Multi-SIM operations. To one base station, the base station may deliver the networks which the base station could support (or the networks which each cell could support, while one or more than one cell is configured by the base station to serve at least one UE) in the (broadcasting) control signaling (e.g., through broadcasting system information).

In the disclosure, it is proposed that one base station may need to clearly inform the UE whether the NW supported by the cell (which may be the camped cell of the UE or serving cell of the UE) or supported by the base station would also support one or more Multi-SIM functionalities or not. Then, the UE could know whether the UE is able to deliver UE information or request (at least) one Multi-SIM operations to (at least) one of its registered NWs.

In this disclosure, solutions would be provided about how the UE obtains "the Multi-SIM supporting indications" through the camped cell/serving cell. In some embodiments, air link control signaling would be also proposed for the UE to inform Multi-SIM related information or to request Multi-SIM related information from its serving cell.

In this disclosure, it is assumed that a UE would have registered with (at least) two Networks, which is called NW_A and NW_B respectively. In addition, the UE is (at least) located in the coverage of both NW_A and NW_B.

The UE may operate on NW_A and NW_B with two Subscriber Identity Modules (SIMs) (or embedded SIMs (eSIMs) or UMTS-SIM) independently (e.g., two USIMs may be embedded in the UE side and the UE is operating with independent CN connections and/or RRC connections with each registered NW (and the RAN associated with the registered NW)). So, one CN_A/RAN_A may serve the UE based on the USIM_A and another CN_B/RAN_B may serve the UE based on the USIM_B.

In some embodiments, it may be considered as two UEs in one device while each UE may be associated with one (and only one) SIM/eSIM/USIM. In addition, from the NW points view, the CN or RAN may consider the UE with one specific USIM as one independent UE. For example, one UE in USIM_A and USIM_B may act as two UEs independently although the USIM_A and USIM_B may be installed in the same device.

In the embodiments of the disclosure, the NW (e.g., NW_A and/or NW_B) may be a NW of one of Public Land Mobile Network (PLMN), Standalone Non-Public Network (SNPN), and Public network integrated NPN (PNI-NPN), but the disclosure is not limited thereto.

In addition, the NW may be associated with different RATs (e.g., E-UTRA and/or NR). In the UE side, the upper layers may instruct the lower layers (e.g., Access Stratum layers) to access NW with one (or two) RAT(s).

In some embodiments, the base station may support E-UTRA and/or New Radio (NR) RATs or other RATs (e.g., Wi-Fi, Bluetooth). In addition, the base station (or the serving cell corresponding to the UE) may have backhaul connections with other base stations (e.g., through X2 interface and/or Xn interface) in its neighborhoods. In other embodiments, the base station may have backhaul connections with Core Networks (such as Next Generation Core (NGC) and/or Evolved Packet Core (EPC)), such as S1 interface or N1/N2 interface. In addition, the RAN and CN may be configured to support one or more NWs.

To one base station, the base station may configure one or more cells to support one or more NWs, which may be any combinations of PLMN(s), SNPN(s), and PNI-NPN(s). To the UE side, the UE may also support NR RAT and/or E-UTRA RAT.

In this disclosure, the descriptions and mechanisms may also be applicable to the device with more than two USIMs installed. In some embodiments, the UE may exchange signaling with the same Base Station (BS). In some other embodiments, the UE may exchange signaling with different Base Stations (e.g., the UE may receive Multi-SIM Support Information from a BS #1 and then the UE may transmit the 'Multi-SIM Support Request' message to another BS #2) during the signaling flow of Multi-SIM operation. In some embodiments, the UE may exchange signaling with the same serving cell. In some other embodiments, the UE may exchange signaling with different serving cells (e.g., the UE may receive Multi-SIM Support Information from a Cell #1 and then the UE may transmit the 'Multi-SIM Support Request' message to the Cell #2) during the signaling flow of Multi-SIM operation, for example, if the Multi-SIM Support information is transmitted in one system information block (SIB) which is area-specific in the serving RAN. Here, an area-specific SIB means that more than one cell would broadcast the same SIB with the same system information area ID.

To the UE side, the UE may store both the area-specific SIB and the associated system information area ID which the UE receives from the serving cell. Then, next time while the UE camps to a new cell, the UE may check the system information area ID and whether the concerned SIB is area-specific to the new cell. The stored SIB may still be valid if the SIB is area-specific to the new cell and the new cell delivers the same system information area ID (and value tag, in some embodiments) with the SIB stored by the UE).

Figure 2:
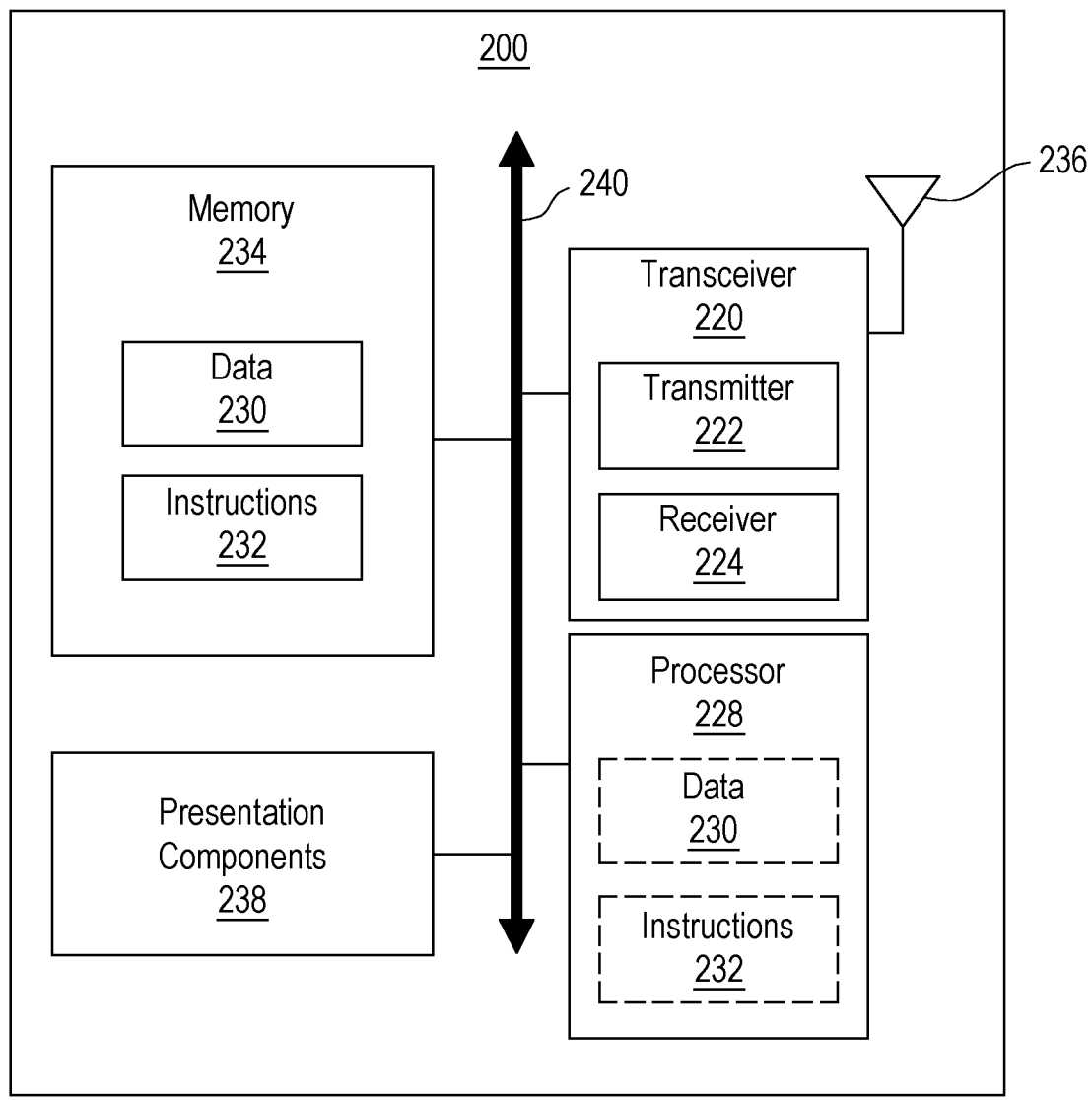
FIG. 2 illustrates a block diagram of a node for wireless communication, in accordance with various aspects of the present application.

See FIG. 2, which illustrates a block diagram of a node for wireless communication, in accordance with various aspects of the present application. As shown in FIG. 2, a node 200 may include a transceiver 220, a processor 228, a memory 234, one or more presentation components 238, and at least one antenna 236. The node 200 may also include an RF spectrum band module, a base station communications module, a network communications module, and a system communications management module, Input/Output (I/O) ports, I/O components, and power supply (not explicitly shown in FIG. 2). Each of these components may be in communication with each other, directly or indirectly, over one or more buses 240. In one embodiment, the node 200 may be a UE or a base station that performs various functions described herein.

The transceiver 220 having a transmitter 222 (e.g., transmitting/transmission circuitry) and a receiver 224 (e.g., receiving/reception circuitry) may be configured to transmit and/or receive time and/or frequency resource partitioning information. In some embodiments, the transceiver 220 may be configured to transmit in different types of subframes and slots including, but not limited to, usable, non-usable and flexibly usable subframes and slot formats. The transceiver 220 may be configured to receive data and control channels.

The node 200 may include a variety of computer-readable media. Computer-readable media can be any available media that can be accessed by the node 200 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable.

Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 234 may include computer-storage media in the form of volatile and/or non-volatile memory. The memory 234 may be removable, non-removable, or a combination thereof. Exemplary memory includes solid-state memory, hard drives, optical-disc drives, etc. As illustrated in FIG. 2, the memory 234 may store computer-readable, computer-executable instructions 232 (e.g., software codes) that are configured to, when executed, cause the processor 228 to perform various functions described herein. Alternatively, the instructions 232 may not be directly executable by the processor 228 but be configured to cause the node 200 (e.g., when compiled and executed) to perform various functions described herein.

The processor 228 (e.g., having processing circuitry) may include an intelligent hardware device, e.g., a Central Processing Unit (CPU), a microcontroller, an ASIC, and etc. The processor 228 may include memory. The processor 228 may process the data 230 and the instructions 232 received from the memory 234, and information through the transceiver 220, the base band communications module, and/or the network communications module.

The processor 228 may also process information to be sent to the transceiver 220 for transmission through the antenna 236, to the network communications module for transmission to a core network.

One or more presentation components 238 presents data indications to a person or other device. Exemplary presentation components 238 include a display device, speaker, printing component, vibrating component, etc.

From the above description, it is manifested that various techniques may be used for implementing the concepts described in the present application without departing from the scope of those concepts. Moreover, while the concepts have been described with specific reference to certain embodiments, a person of ordinary skill in the art would recognize that changes may be made in form and detail without departing from the scope of those concepts. As such, the described embodiments are to be considered in all respects as illustrative and not restrictive. It should also be understood that the present application is not limited to the particular embodiments described above, but many rearrangements, modifications, and substitutions are possible without departing from the scope of the present disclosure.

Figure 3:
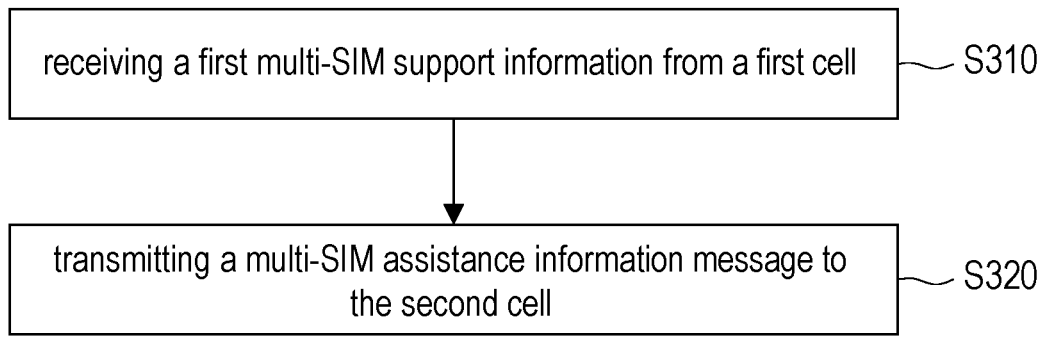
FIG. 3 shows a flow chart of the method for maintaining multi-SIM configuration according to an embodiment of the disclosure.

See FIG. 3, which shows a flow chart of the method for maintaining multi-SIM configuration according to an embodiment of the disclosure. The method of this embodiment may be executed by the UE (e.g., the node in FIG. 2), and the details of each step in FIG. 3 will be described below with the components shown in FIG. 2.

In step S310, the processor 228 controls the transceiver 220 to receive a first multi-SIM support information from a first cell, wherein the first multi-SIM support information is generated and transmitted from a second cell to the first cell via an inter-node signaling from the second cell to the first cell, and the first cell and the second cell belong to a first network.

In one embodiment, the first cell can be a previous serving cell of the UE, and the second cell can be a current serving cell of the UE. In some embodiments, the first network is an NR cellular network, which is a PLMN, SNPN, or a PNI-NPN, but the disclosure is not limited thereto. In the following descriptions, the NW_A mentioned in the above would be used as an example of the first network for better understanding. In the embodiments of the disclosure, the UE can be the UE in FIG. 1, which at least has the USIM-A for communicating with the NW_A and the USIM-B for communicating with the NW_B.

In the following embodiments, the UE is assumed to be currently in the RRC connected state with the NW_A and in the RRC idle/inactive state with the NW_B, but the disclosure is not limited thereto. That is, the NW_A is assumed to be the current serving NW of the UE.

In one embodiment, the first multi-SIM support information includes a release indicator that instructs the UE to release a plurality of first multi-SIM configurations, wherein the first multi-SIM configurations are configured by the first cell and stored by the UE before the UE receives the first multi-SIM support information. In some embodiments, the first multi-SIM configurations can be a set of various configurations related to the multi-SIM operations that the UE can perform with the first network.

In one embodiment, the processor 228 releases the first multi-SIM configurations in response to the release indicator. In particular, the processor 228 can release at least one of the first multi-SIM configurations in response to the release indicator.

In a first embodiment, the first multi-SIM configurations include a first leaveWithoutResponseTimer (referred to as $T_L$), and the processor 228 can use this parameter as an initial value of a running Leave Timer. The processor 228 can start the Leave Timer while a new multi-SIM operation is applied (to one associated NW and one associated USIM). Then, the UE may start to count the Leave Timer to zero. The UE may keep the multi-SIM operation while the timer is still counting and no new Multi-SIM operation/configuration (to the same associated NW and the same associated USIM) is provided/configured to the UE. In one embodiment, after the Leave Timer expires, the UE can automatically remove the stored multi-SIM record/stop the on-going multi-SIM operation. In one embodiment, the processor 228 can reset the Leave Timer to $T_L$ and then re-start the Leave Timer if the UE is configured to implement an updated Multi-SIM operation/Multi-SIM configuration (to the same associated NW and the same associated USIM). In one embodiment, the processor 228 stops the Leave Timer after the UE releases the plurality of first multi-SIM configurations.

In the embodiments of the disclosure, the UE can move (or connect) to a second network in some cases (e.g., Case 1 to 6 in the above). In the following descriptions, the NW_B mentioned in the above would be used as an example of the second network for better understanding. In one embodiment, the first multi-SIM configurations include a multi-SIM gap configuration, wherein the multi-SIM gap configuration is used for the UE to switch to communicate with the second network (i.e., the NW_B) during a multi-SIM gap time period indicated by the multi-SIM gap configuration.

In one embodiment, during the multi-SIM gap time period, the UE can be in the RRC connected state with the second network (i.e., the NW_B) and be in the idle/inactive state with the first network (i.e., the NW_A). In particular, during the multi-SIM gap time period, the USIM-B of the UE can be in the RRC connected state with the second network (i.e., the NW_B), and the USIM-A of the UE can be in the idle/inactive state with the first network (i.e., the NW_A), but the disclosure is not limited thereto. In another embodiment, during the multi-SIM gap time period, the UE can be in the RRC connected state with the first network (i.e., the NW_A) and be in the connected state with the second network (i.e., the NW_B).

In the first embodiment, the processor 228 stops applying the multi-SIM gap configuration after the UE releases the first multi-SIM configurations. In particular, the processor 228 can stop applying, including but not limited to, the multi-SIM gap time period.

In a second embodiment, the first multi-SIM support information include a plurality of second multi-SIM configurations, wherein the second multi-SIM configuration can be another set of various configurations related to the multi-SIM operations that the UE can perform with the first network. In one embodiment, the UE can overwrite the first multi-SIM configurations with the second multi-SIM configurations. In particular, the processor 228 can replace one or more of the first multi-SIM configurations with the corresponding second multi-SIM configurations, but the disclosure is not limited thereto.

In one embodiment, the processor 228 stops the Leave Timer after the UE overwrites the first multi-SIM configurations with the second multi-SIM configurations.

In the second embodiment, the first multi-SIM configurations include a plurality of first multi-SIM gap configurations, and the processor 228 stops applying a first multi-SIM gap time period, which is determined by the UE based on the first multi-SIM gap configurations to communicate with the second network during the first multi-SIM gap time period, after the UE overwrites the first multi-SIM configurations with the second multi-SIM configurations.

In the second embodiment, the second multi-SIM configurations include a second leave WithoutResponseTimer. In one embodiment, when the UE intends to switch to connect/communicate with the second network (i.e., the NW_B), the processor 228 can control the transceiver 220 to transmit a leave indicator to the second cell (i.e., the current serving cell), wherein the leave indicator informs the second cell that the UE intends to (temporarily) leave the first network (i.e., the NW_A). Afterwards, the processor 228 starts counting the Leave Timer, wherein the initial value of the Leave Timer is determined based on the second leave WithoutResponseTimer. In one embodiment, the processor 228 releases the RRC connection with the second cell after the Leave Timer expires.

In the second embodiment, the second multi-SIM configurations include a plurality of second multi-SIM gap configurations, and the processor 228 can switch from the first network (i.e., the NW_A) to communicate with the second network (i.e., the NW_B) during a second multi-SIM gap time period determined by any combinations of the second multi-SIM gap configurations, after the UE overwrites the first multi-SIM configurations with the second multi-SIM configurations.

In step S320, the processor 228 controls the transceiver 220 to transmit a multi-SIM assistance information message to the second cell, wherein the multi-SIM assistance information message is determined based on the first multi-SIM support information.

In various embodiments, the multi-SIM assistance information message can include a multi-SIM support request message. In some embodiments, the multi-SIM support request message can include any combination of the leave indicator, a come back indicator, a busy indicator, and a not busy indicator. In the embodiments of the disclosure, the UE with the capability of performing the multi-SIM operation can be regarded as that the UE is capable of transmitting the above indicator(s), wherein the leave indicator and the come back indicator can be used to communicate with the first network (i.e., the NW_A), and the busy indicator and the not busy indicator can be used to communicate with the second network (i.e., the NW_B).

In one embodiment, the UE can transmit the leave indicator to the first network when the UE plans to switch to the second network for signaling/data exchange. In another embodiment, the UE can transmit the come back indicator to the first network when the UE plans to switch back to NW_A for signaling/data exchange.

In one embodiment, the UE may transmit one or more busy indicator and/or not busy indicators to the NW_B if the UE plans to stay in NW_A for signaling/data exchange. In one embodiment, the UE may not try to monitor the NW_B (and so the serving RAN associated with NW_B) after the UE transmitting (at least) one busy indicator to the NW_B. For example, the UE may not monitor the paging (e.g., paging DCI, short message, paging message) delivery from the NW_B (and so the (serving) RAN associated with NW_B) for a time period after the UE transmitting the busy indicator to the NW_B. In some embodiments, the UE may still need to monitor the paging (e.g., paging DCI, short message, paging message) delivery from the NW_B (and so the (serving) RAN associated with NW_B) even after the UE transmitting the busy indicator to the NW_B.

In some embodiments, whether the UE need to monitor the paging delivery from the NW_B (and so the (serving) RAN associated with NW_B) after the UE transmitting the busy indicator the NW_B may be based on pre-defined rules or configurations/control from the NW (e.g., the instructions from NW_A or NW_B) or UE embodiments or indications from the upper layer(s).

In some embodiments, each of the indicators in the above can be an Access Stratum (AS layer) Signaling, where the target destination would be RAN/Base Station/Cell. In some other embodiments, each of the indicators in the above can be a Non-Access Stratum (NAS layer) Signaling, where the target destination would be Core Network (e.g., EPC or 5GC) such as a network entity in the Core Network (e.g., Access and Mobility Management Function (AMF)).

In one embodiment, the UE can be informed that whether the UE is allowed to send one or more of the above indicators to the NW_A according to the first multi-SIM support information received from the first cell. Details would be provided in the following.

In the Radio Access Network (RAN) side, one cell may be configured (by the Base Station) to support one or more Networks (e.g., PLMN or private network/non-public network). In NWs associated with the cell, some NWs may support multi-SIM operations, but others may not. Associated one Network, one cell may be configured to support different core networks. For example, one cell may indicate that it supports: EPC only; 5GC only; EPC and SGC, which also means that one base station may connects with a. EPC only, b. 5GC only, or c) EPC and 5GC in its CN connections.

In addition, different core networks may or may not support the multi-SIM operations even though they may be associated to the same PLMN/private network. Base station/Cell may further indicate whether the NWs supported by the cells would support multi-SIM operation. In addition, to one NW, the Base station may further indicate whether the CN (e.g., EPC/5GC) associated with the NW supports multi-SIM operation.

For one NW which supports the multi-SIM operation, it may represent the NW supports the UE to deliver one or more of the above indicators.

In an embodiment A1, the NW supports the UE to deliver the leave indicator to the NW (and/or the RAN associated with the NW) itself. That is, to one UE, the UE could transmit one leave indicator to the NW (e.g., NW_A) if the UE wants to switch to another NW (e.g., NW_B) for signaling/data/packet exchange and the NW_A supports multi-SIM operation (e.g., the leave indicator transmission).

In some embodiments, the base station may indicate that one of the supported NW(s) does not support multi-SIM operation (e.g., NW_A does not support the UE to deliver leave indicator to the NW_A (and/or the RAN associated with the NW_A) itself). For example, one 'multi-SIM-Not-Support' indicator may be delivered to be associated with NW_A in the broadcasting system information. Under this condition, in some additional embodiments, the UE may implicitly know that one NW (supported by the serving Base station) does support multi-SIM operation (as a default setting) if the base station does not indicate that one NW does not support multi-SIM operation. For example, if NW_A is supported by the base station/cell without 'multi-SIM-Not-Support' indicator association, the UE would implicitly know that the NW_A supports multi-SIM operation.

In some other embodiments, the UE may implicitly know that one NW (supported by the serving base station) does not support multi-SIM operation if the base station does not deliver any multi-SIM Support Information associated with the concerned NW.

In some embodiments, if the base station (or cell) indicates that one NW (e.g., NW_A with PLMN identity #1) supports the multi-SIM operation (e.g., the leave indicator and/or the come back indicator, which would be introduced later), it also means that all of the CN types supported by the NWA would also support the multi-SIM operation (no matter whether the NW_A supports EPC only/5GC only/both EPC and 5GC in the serving cell).

To the UE side, the UE may (be allowed/enabled/configured to) deliver the leave indicator to the serving cell (associated with NW_A) if its registered NW (NW_A) supports multi-SIM operation (e.g., leave indicator transmission is supported) and the UE prepares to switch from NW_A to another NW_B. Otherwise, the UE would not (be allowed/enabled/configured to) deliver leave indicator to the serving cell (or to the associated with NW_A) even if the UE wants to switch to NW_B.

In one embodiment, the NW which associates with the EPC (or 5GC) would support the UE to deliver the leave indicator to the NW (and/or the RAN associated with the NW) itself. Therefore, to one UE, the UE is enabled/configured/allowed to transmit one leave indicator to the NW (e.g., NW_A) if the UE wants to switch to another NW (e.g., NW_B in FIG. 1) for signaling/data/packet exchange.

Please also note, in some embodiments, the BS/Cell may indicate that the NW connected with EPC/5GC does not support the UE to deliver the leave indicator to the NW (and/or the RAN associated with the NW) itself.

Accordingly, after receiving the multi-SIM support information (which indicates that the leave indicator is/is not supported to one or more supported NW(s)) from the serving cell, to the UE side with one registered CN (e.g., EPC/5GC), the UE would (be allowed/enabled/configured to) deliver the leave indicator to the serving cell (associated with NW_A & registered CN of the UE) if the NW_A associated with the UE's registered CN supports the multi-SIM operation and the UE prepares to switch from NW_A to another NW_B. Otherwise, the UE would not (be allowed/enabled/configured to) deliver the leave indicator to the serving cell (of NW_A and/or the registered CN associated with NW_A of the UE) if the NW_A associated with the UE's registered CN (or selected CN) does not support multi-SIM operation even though the UE prepares to switch from NW_A to another NW_B.

In some embodiments, if the base station (or cell) indicates that one NW (e.g., NW_A with PLMN identity #1) does not support the multi-SIM operation (e.g., the leave indicator transmission), it also means that all of the CN types supported by the NW_A also does not support the multi-SIM operation (e.g., the leave indicator transmission) (e.g., no matter whether the NW_A supports EPC only/5GC only/both EPC and 5GC).

From another perspective, to fulfil the requirement of exchanging packets with more than one NW with limited hardware, the UE may transmit one 'leave indicator' to the NW_A (e.g., through a UE-specific (Access Stratum (AS)/Non-Access Stratum (NAS)) control signaling, such as an RRC signaling, Medium Access Control (MAC) Control Element (CE), or an Uplink Control Information (UCI) in a PUCCH (Physical Uplink Control Channel)). The purpose of leave indicator is to inform the NW_A that the UE may temporally leave from the NW_A and then connect with another NW (e.g., NW_B) for signaling/data exchange. After receiving the leave indicator from the UE, the serving cell of the NW_A may configure one or more measurement gap(s)/scheduling gap(s)/short leave period(s)/long leave period(s) to the UE for the UE to leave from the signaling/ data/packet exchange with the serving cell of NW_A. In some other embodiments, the serving cell (of NW_A) may instruct the UE to move to RRC Inactive state/RRC inactive state/RRCINACTIVE state (or RRC Idle state/RRC idle state/RRCIDLE state) (associated with the registered NW_A) and then then the UE may move to RRC Inactive/Idle state after receiving the instruction from the serving cell (e.g., RRCRelease message w/wo suspendconfiguration). Therefore, after sending the leave indicator to the NW_A, in some embodiments, the UE may try to connect with NW_B by establishing RRC Connection with the NW_B (e.g., the UE may initiate a (2-step/4-step) random access procedure with the serving cell of NW_B and transmit a RRCSetupRequest message to the serving cell during the RA procedure). In some other embodiments, the UE may resume the RRC Connection with NW_B by initiating a (2-step/4-step) Random Access procedure with the serving cell of NW_B and transmitting a RRCResumeRequest message to the serving cell during the RA procedure. In some other embodiments, after leaving from the NW_A, the UE may start to monitor the paging messages delivered by the serving cell in the NW_B (e.g., by monitoring the paging occasions calculated based on the UE ID obtained by the registered/selected NW_B and/or the paging parameters broadcast by the registered/selected NW_B).

In some embodiments, the RAN in this disclosure may be Evolved Universal Terrestrial Radio Access Network (E-UTRAN) or Next Generation-Radio Access Network (NG-RAN). In some embodiments, to the UE side, the NW_A/NW_B may be the registered NW(s) or selected NW(s) (which is instructed by the upper layers, from the AS layer's point of view) of the UE side.

In an embodiment A2, the NW supports the UE to deliver the come back indicator to the NW (and/or the RAN associated with the NW) itself (after the UE has transmitted one or more leave indicator to the corresponding NW). For the come back indicator, it happens while the UE comes back to the original NW (e.g., the NW_A in the FIG. 1) after the UE transmitting the leave indicator to the original NW (NW_A). By transmitting the come back indicator, the UE informs the NW_A that it comes back to the NW_A for signaling/data exchange after the UE has transmitted leave indicator to the NW_A previously. In some embodiments, the RRC connection between the UE and the NW_A can be resumed after the UE transmitting the come back indicator to the NW_A. In some other embodiments, the UE may resume the control signaling/data exchange/PDCCH monitoring/measurement reporting between the UE and the NW_A after the UE transmitting come back indicator to the NW_A.

To the UE side, the UE would (be allowed/enabled/configured to) deliver (at least) one come back indicator to the serving cell (associated with NW_A) if the registered NW supports the multi-SIM operation (e.g., the come back indicator transmission is supported) and the UE prepares to switch back from the NW_B to the NW_A. Otherwise, the UE would not (be allowed/enabled/configured to) deliver come back indicator to the serving cell (associated with NW_A) if the UE wants to switch back to NW_A. In some embodiments, a UE may be allowed to transmit a come back indicator to the serving cell (associated with NW_A) if the registered NW supports the multi-SIM operation (e.g., come back indicator transmission is supported) and if the measurement gap (or scheduling gap, long leave period, shore leave period) is configured and is not running out/not valid or is still active/counting. In some embodiments, a UE may not be allowed to transmit a come back indicator to the serving cell (associated with NW_A) if the registered NW supports multi-SIM operation (e.g., come back indicator transmission is supported), but the measurement gap (or scheduling gap, long leave period, shore leave period) is configured and is still running/valid/active/counting.

In some embodiments, if the base station (or cell) indicates that one NW (e.g., NW_A with PLMN identity #1) supports come back indicator, it also means that all of the CN types supported by the NW_A would also support the come back indicator transmission (no matter whether the NW_A supports EPC only/5GC only/both EPC and 5GC).

In some embodiments, if the base station (or cell) indicates that one NW (e.g., NW_A with PLMN identity #1) does not support multi-SIM operation (e.g., the come back indicator transmission), it also means that all of the CN types supported by the NW_A also do not support multi-SIM operation (e.g., Not Busy Indicator Transmission) (no matter whether the NW_A supports EPC only/5GC only/both EPC and 5GC).

In one embodiment, the NW which connects to EPC (or 5GC) would support the UE to deliver the come back indicator to the NW (and/or the RAN associated with the NW) itself. (So, to one UE, the UE could transmit one come back indicator to the NW (e.g., NW_A) if the UE wants to switch back to the original NW (e.g., NW_A) for signaling/data/packet exchange since the UE has transmitted one or more leave indicator to the NW_A previously.

In some embodiments, the base station may indicate that the NW connected with EPC/5GC does not support the UE to deliver the come back indicator to the NW (and/or the RAN associated with the NW) itself. Therefore, after receiving the multi-SIM support information (e.g., the come back indicator transmission is supported) from the serving cell, to the UE side with one registered CN (e.g., EPC/5GC), the UE would (be allowed/enabled/configured to) deliver come back indicator to the serving cell (associated with NW_A & registered CN of the UE in the NW_A) if the NW_A associated with the UE's registered CN supports multi-SIM operation. Otherwise, the UE would not (be allowed/enabled/configured to) deliver come back indicator to the serving cell (associated with NW_A & registered CN of the UE) if the NW_A associated with the UE's registered CN does not support multi-SIM operation (e.g., the come back indicator transmission is not supported).

In an embodiment B1, the NW (e.g., NW_B) supports the UE to deliver the busy indicator to the registered NW itself (and/or the RAN associated with the target NW, such as the NW_B). For example, the NW_B may be able to page the UE through the assistance of NW_A (through the backhaul connection between NW_A/NW_B). Therefore, the UE needs not to switch from NW_A to NW_B for paging message monitoring.

In one embodiment, the NW supports the UE to deliver the busy indicator to the NW itself (and/or the RAN associated with the target NW). For example, the UE may have registered to NW_A and NW_B. Then, the UE has sent the busy indicator (or the multi-SIM Support Request message) to the NW_B (and/or the RAN associated with the NW_B) only while the NW_B supports the multi-SIM operation (e.g., NW_B configures/allows/enables the UE to deliver the busy indicator to the NW itself (e.g., NW_B) and the NW_A supports the multi-SIM operation (e.g., the NW_A supports the UE to deliver leave indicator to NW_A for switching to NW_B).

In some embodiments, it is assumed that the NW_A may also need to indicate that NW_A supports the multi-SIM operation (e.g., the transmission of leave indicator and/or come back indicator). Then, in some embodiments, the UE may be allowed to deliver the busy indicator to NW_B only while the UE is configured that the NW_A supports the multi-SIM operation (e.g., by receiving the broadcasting system information transmitted by the serving cell, which supports NW_A). In contrast, the UE may not be allowed to transmit the busy indicator to the NW_B if the NW_B does not support the multi-SIM operation.

The same embodiment may also be applicable to the case while the registered/selected CN type of the UE and the CN types of NW_A/NW_B is considered in the decision rules.

In one embodiment, the NW (e.g., NW_B) which associated EPC (or 5GC) would support the UE to deliver the busy indicator to the NW (and/or the RAN associated with the NW) itself. Therefore, to one UE, the UE is enabled/configured/allowed to transmit the busy indicator to the NW (e.g., NW_B) if the UE wants to stay in another NW (e.g., NW_A) for signaling/data/packet exchange.

In some embodiments, the base station may indicate that the NW connected with EPC/5GC does not support the UE to deliver the busy indicator to the NW (and/or the RAN associated with the NW) itself. For example, one 'multi-SIM-Not-Support' indicator may be delivered to be associated with NW_B in the broadcasting system information. Under this condition, in some additional embodiments, the UE may implicitly know that one NW (supported by the serving Base station) does support the multi-SIM operation (as a default setting) if the base station does not indicate that one NW does not support multi-SIM operation. For example, if NW_B is supported by the base station/cell without 'multi-SIM-Not-Support' indicator association, the UE would implicitly know that the NW_B supports multi-SIM operation.

In one embodiment, after receiving the multi-SIM support information (e.g., the busy indicator is/is not supported to one or more supported NW(s)) from the serving cell, to the UE side with one registered CN (e.g., EPC/5GC), the UE would (be allowed/enabled/configured to) deliver the busy indicator to the serving cell (associated with NW_B & registered CN of the UE) if the NW_B associated with the UE's registered CN supports multi-SIM operation and the UE prepares to switch from NW_B back to NW_A (and then the UE may stay in the NW_A for a while so that the UE may not move back to NW_B for a time period, where the unit of the time period may be represented by second, millisecond, symbol, mini-slot, slot, subframe, radio frame, (default) paging cycle, and/or Discontinuous Reception (DRX) cycle). Otherwise, the UE would not (be allowed/enabled/configured to) deliver the busy indicator to the serving cell (of NW_B and/or the registered CN associated with NW_B of the UE) if the NW_B (associated with the UE's registered CN in the NW_B) does not support the multi-SIM operation even though the UE prepares to switch from NW_B back to NW_A and then stay in NW_A for a time period.

In some embodiments, if the base station (or cell) indicates that one NW (e.g., NW_B with PLMN identity #2) does not support the multi-SIM operation (e.g., the busy indicator transmission), it also means that all of the CN types supported by the NW_B also does not support multi-SIM operation (e.g., Busy Indicator Transmission) (e.g., no matter whether the NW_B supports EPC only/5GC only/both EPC and 5GC).

In an embodiment B2, the NW supports the UE to deliver the not busy indicator to the NW (and/or the RAN associated with the NW) itself (after the UE has transmitted one or more the busy indicator to the corresponding NW). For the not busy indicator, it happens after the UE comes back to the original NW (e.g., the NW_B) while the UE moves to another NW (e.g., the NW_A) for signaling/data/packet exchange (after transmitting the busy indicator to the NW_B). By transmitting the not busy indicator, the UE informs the NW_B that it comes back to the NW_B for signaling/data exchange after the UE has transmitted one or more the busy indicator to the NW_B previously.

In some embodiments, the UE may inform the NW_B that it comes back to the NW_B for signaling/data exchange after the UE receives the paging message including the UE ID from the NW_B no matter whether the UE has transmitted any the busy indicator to the NW_B previously.

To the UE side, the UE would (be allowed/enabled/configured to) deliver the not busy indicator to the serving cell (associated with NW_B) if the registered NW supports multi-SIM operation (e.g., the not busy indicator transmission is supported) and the UE prepares to keep monitoring NW_B. Otherwise, the UE would not (be allowed/enabled/configured to) deliver the not busy indicator to the serving cell (associated with NW_B) if the UE wants to switch back to NW_B and keep monitoring NW_B.

In some embodiments, if the base station (or cell) indicates that one NW (e.g., NW_B with PLMN identity #2) supports the not busy indicator, it also means that all of the CN types supported by the NW_B would also support the not busy indicator transmission (no matter whether the NW_B supports EPC only/5GC only/both EPC and 5GC).

In some embodiments, if the base station (or cell) indicates that one NW (e.g., NW_B with PLMN identity #2) does not support multi-SIM operation (e.g., the not busy indicator transmission), it also means that all of the CN types supported by the NW_B also does not support multi-SIM operation (e.g., the not busy indicator transmission) (no matter whether the NW_B supports EPC only/5GC only/both EPC and 5GC).

In one embodiment, the NW which connects to EPC (or 5GC) would support the UE to deliver the not busy indicator to the NW (and/or the RAN associated with the NW) itself. Therefore, to one UE, the UE could transmit one the busy indicator to the NW (e.g., NW_B) if the UE wants to switch to another NW (e.g., NW_A) for signaling/data/packet exchange and then UE may not monitor NW_B at least for a time period (e.g., the UE may not monitor the paging message delivery from the NW_B and the associated RAN of NW_B for a while). In some embodiments, the base station may indicate that the NW connected with EPC/5GC does not support the UE to deliver the not busy indicator to the NW (and/or the RAN associated with the NW) itself.

In one embodiment, after receiving the multi-SIM support information (e.g., the not busy indicator transmission is supported) from the serving cell, to the UE side with one registered CN (e.g., EPC/5GC), the UE would (be allowed/enabled/configured to) deliver the not busy indicator to the serving cell (associated with NW_B & registered CN of the UE) if the NW_B associated with the UE's registered CN supports multi-SIM operation and the UE prepares to switch from NW_B to another NW_A. Otherwise, the UE would not (be allowed/enabled/configured to) deliver the not busy indicator to the serving cell (associated with NW_B & registered CN of the UE) if the NW_B associated with the UE's registered CN does not support multi-SIM operation (e.g., the not busy indicator transmission is not supported).

In some embodiments, a UE may be allowed to transmit the not busy indicator to the serving cell (associated with NW_B) if the registered NW supports the multi-SIM operation (e.g., the not busy indicator transmission is supported)

and if the measurement gap (or scheduling gap, long leave period, shore leave period) is configured and is not running out/not valid or is still active/counting. In some embodiments, a UE may not be allowed to transmit the not busy indicator to the serving cell (associated with NW_B) if the registered NW supports the multi-SIM operation (e.g., the not busy indicator transmission is supported), but the measurement gap (or scheduling gap, long leave period, shore leave period) is configured and is still running/valid/active/counting.

In various embodiments, the BS/Cell would deliver one (or more) downlink control signaling, which contains one indicator (associates with one or more NWs) to indicate that whether one NW supports the multi-SIM operation. In different embodiments, the multi-SIM support information can be delivered through any combinations of the following approaches.

Approach 1: Broadcasting system information. In some embodiments, the system information for the multi-SIM support information delivery may be area-specific (e.g., be associated with one systeminformationarea-ID, which is also broadcasted by the cell in System Information Block Type 1 (SIB1)). In some additional embodiments, the UE may request the multi-SIM support information SIB through the SI on-demand procedure. In some additional embodiments, the SIB conveys the multi-SIM support information may be further segmented by the base station (e.g., each segment SIB would also be transmitted with one Segment ID). Therefore, to the UE side, the UE may need to collect all of the SIB segments to re-assemble a valid SIB. Otherwise, before the UE re-assembling the SIB (of the multi-SIM support information) successfully, the UE would not consider it has a valid SIB. In addition, the stored SIB segments may be released/dropped after cell (re)selection.

Approach 2: group-based control signaling (e.g., group-based RRC signaling, which is encoded with one group-based RNTI). In some embodiments, the serving RAN may transmit the group-based RRC signaling by delivering a group-based DCI to indicate the locations of physical resource blocks used to convey the target group-based RRC signaling. In addition, the group-based DCI may also be encoded/scrambled by the same group-based RNTI. One or more UE may be (pre-)configured by the serving RAN with one or more group-based RNTI. The UE could try to decode at least one PDCCH by using the group-based RNTI (e.g., through blind decoding procedures). Then, after successful decoding one or more DCI(s) in the PDCCH, the UE may (also) try to decode the following target physical resource blocks (indicated by the decoded DCI) by using the same group-based RNTI (associated with the DCI). The UE may obtain the group-based RRC signaling successfully by decoding the target physical resource blocks successfully. Therefore, the serving RAN could deliver one DL-RRC signaling, which the information/configuration could be shared by more than one UE, to more than two UEs simultaneously by transmitting the group-based RRC signaling), or DCI transmitted through group-PDCCH/PDCCH (e.g., a group-based RNTI may be used to scramble the DCI and the UE having the group-based RNTI can decode the DCI transmitted through group-PDCCH/PDCCH and apply the parameters in the DCI).

Approach 3: UE-specific RRC signaling (e.g., RRCReconfiguration message, RRCRelease message which instructs the UE to move to RRC Idle/inactive state).

Approach 4: Medium Access Control (MAC) Control Element.

In some embodiments, to UE in (NR) RRC Connected state, the serving cell may deliver the multi-SIM support information to the UE (e.g., through UE-specific RRC signaling) only after the UE has indicated that the UE supports the multi-SIM operation to the serving cell (e.g., the UE may report the multi-SIM operation support through UEAssistanceInformation delivery or through UE capability enquiry procedure (e.g., after the serving cell transmitting UE capability Enquiry message to the UE)). In some additional embodiments, the serving base station of the UE (e.g., the base station which configures the serving cell of the UE) may obtain the UE information (e.g., whether the UE supports 'multi-SIM Operation' or not) from the neighbour base stations (e.g., through the inter-node signaling) or from the Core Network through the backhaul connection.

In some additional embodiments, the UE would not be able to initiate the multi-SIM support request message transmission to the serving cell before the UE receives the multi-SIM support information from the serving cell. (e.g., the UE may be allowed to send the multi-SIM support request message to the serving cell only while the UE receives the multi-SIM support information from the cell or the UE has stored a valid SIB for the multi-SIM support information, which is also applicable to the cell (e.g., the stored the multi-SIM support information is associated with one stored Systeminformationarea-ID, which is also broadcasted by the serving cell)).

In some embodiments, the UE may receive the multi-SIM support information from the serving cell through both 'System information' and 'UE-specific RRC signaling'. In this condition, the multi-SIM support information obtained through the UE-specific RRC signaling may have higher priority than the multi-SIM support information obtained through broadcasting system information. In one embodiment, the UE may replace the stored the multi-SIM support information with the received the multi-SIM support information from the serving cell through either 'System information' or 'UE-specific RRC signaling' or 'group-based RRC signaling'. That is, the UE may delete/discard the stored the multi-SIM support information and store (and/or apply) the received the multi-SIM support information when the UE receives the multi-SIM support information from the serving cell through either 'System information' or 'UE-specific RRC signaling' or 'group-based RRC signaling'.

In some embodiments, the UE may receive the multi-SIM support information from the serving RAN only through the downlink signaling (e.g., system information) of Special Cell, such as the Primary Cell (PCell) or the Primary Secondary Cell (PSCell) from the serving RAN. In addition, the UE may have to monitor (and keep) the latest multi-SIM support information (e.g., the latest multi-SIM support information delivered through broadcasting system information) if the UE wants to implement the multi-SIM operation.

In some embodiments, one bitmap (or sequence) may be configured to provide the multi-SIM support information. For example, the multi-SIM support information may be configured as a sequence of Boolean variable: "multi-SIM support information"=Sequence {Boolean #1, Boolean #2, Boolean #3, . . . }. The Boolean variable Boolean #1 may be associated with the $1^{st}$ PLMN identity appeared in the PLMNidentitylist, which may be broadcasted by the serving cell in the broadcasting system information (e.g., SIB1). Then, the Boolean variable Boolean #2 may be associated with the $2^{nd}$ PLMN identity appeared in the PLMNidentitylist, and so on. In addition, the Boolean #1=true means that the PLMN (associated with the $1^{st}$ PLMN identity in the PLMNidentitylist) supports multi-SIM operation. In contrast, the Boolean #1=false means that the PLMN (associated with the 1st PLMN identity in the PLMNidentitylist) does not support multi-SIM operation.

In some additional embodiment, one sequence may be configured for public networks (e.g., PLMN) and another sequence may be configured for private networks (or non-public networks). For example, a sequence "multi-SIM support information for Non-Public Network (NPN)" may be configured to the UE.

For example, "multi-SIM support information for NPN"=Sequence {Boolean #1, Boolean #2, Boolean #3, . . . }. The Boolean variable Boolean #1 may be associated with the $1^{st}$ NPN identity appeared in the npn-IdentityList, which may be broadcasted by the serving cell in the broadcasting system information (e.g., SIB1). Then, the Boolean variable Boolean #2 may be associated with the $2^{nd}$ NPN identity appeared in the npn-IdentityList, and so on. In this condition, the "multi-SIM support information for NPN" may be provided by the cell in the associated NPN-IdentityInfoList.

In some embodiments, one bitmap {Bit #1, Bit #2, . . . } may be configured to be associated with the PLMNs in PLMNidentitylist or NPN-identityList. The Bit #1 may be associated with the $1^{st}$ PLMN identity appeared in the PLMNidentitylist, which may be broadcasted by the serving cell in the broadcasting system information (e.g., SIB1). Then, the Bit #2 may be associated with the $2^{nd}$ PLMN identity appeared in the PLMNidentitylist, and so on. In addition, the Bit #1=1 (or 'true', or 'support') means that the PLMN (associated with the 1st PLMN identity in the PLMNidentitylist) supports multi-SIM operation. In contrast, the Bit #1=0 (or 'false', or 'not support') means that the PLMN (associated with the 1st PLMN identity in the PLMNidentitylist) does not support multi-SIM operation.

In some embodiments, one bitmap {Bit #1, Bit #2, . . . } may be configured to be associated with the supported CN types of one NW indicated in the PLMNidentitylist or NPN-identityList. The Bit #1 may be associated with the $1^{st}$ CN type supported by the corresponding NW (e.g., EPC). Then, the Bit #2 may be associated with the $2^{nd}$ CN type supported by the corresponding NW (e.g., 5GC). In addition, the Bit #1=1 means that the NW which associated EPC would support multi-SIM operation. In contrast, the Bit #1=0 means the NW which associated EPC does not support multi-SIM operation. Then, the Bit #2=1 means that the NW which associates with 5GC would support multi-SIM operation. In contrast, the Bit #2=0 means the NW which associates with 5GC does not support multi-SIM operation.

The same concept would also be applicable to a sequence of Enumerator {Support, Not Support} or {Enabled, Disabled}. In some additional embodiments, the cell may broadcast one bit/Enumerator/Boolean variable to be associated with all of the NWs (e.g., public networks and/or non-public networks) or a subset of the NWs supported by the cell.

In some embodiments, UE may pre-store the information/configuration/parameters/data/values of the multi-SIM operation associated with each registered/selected network in the USIM (UMTS Subscriber Identity Module). Therefore, the UE may need not monitor the broadcasting multi-SIM support information delivered by the serving RAN. In addition, the UE may receive the multi-SIM support information from the NW (e.g., CN/RAN) while the UE is connecting with the NW. Then, the received multi-SIM support information may become part of the stored information in the UE side. Therefore, the UE may decide whether to initiate/implement the multi-SIM operation to one target (registered/selected) NW based on the UE stored information.

In some embodiments, the multi-SIM support information may not be transmitted by the Base station (e.g., through broadcasting system information or through UE-specific RRC signaling). Then, the UE may decide whether to initiate/implement the multi-SIM operation based on the UE stored information.

In some additional embodiments, the UE may be able to receive the multi-SIM support information from the serving RAN/CN even though the UE also has stored multi-SIM support information. In this condition, the UE may overwrite (all or part of) the stored multi-SIM support information by the received multi-SIM support information. Moreover, delta signaling approach may or may not be applied in the overwrite condition (e.g., the UE may delete all of the stored multi-SIM Support information and then store the multi-SIM support information received from the serving NW after the UE receiving an updated multi-SIM support information from the serving cell. It is also possible that the UE may just update the stored multi-SIM support information by using the Information Elements (IE) appeared in the multi-SIM support information from the serving NW. For the IEs founded in the stored multi-SIM support information but not be founded in the multi-SIM support information from the serving NW, the UE may or may not keep these stored IEs).

In the following embodiments, the designs related to the multi-SIM support request message and multi-SIM support response message would be provided.

As mentioned in the above, the multi-SIM assistance information message can include the multi-SIM support request message, which includes any combination of the leave indicator, the come back indicator, the busy indicator, and the not busy indicator.

In some embodiments, the indicators provided in this disclosure may be an Access Stratum (AS layer) Signaling, where the target destination would be RAN/Base Station/Cell. In some other embodiments, the indicators provided in this disclosure may be a Non-Access Stratum (NAS layer) Signaling, where the target destination would be a network entity in the Core Network (e.g., EPC or 5GC). The UE may transmit the NAS Signaling to the network entity in the Core Network via the RAN/Base Station/Cell. In the air link, NAS signaling may be contained in one UL RRC signaling to the serving cell.

In some embodiments, the UE may transmit multi-SIM support request through a random access (RA) procedure (e.g., 2-step RA procedure/4-step RA procedure).

The UE may stay in RRC Inactive state, and then the UE may transmit the multi-SIM support request message as one Information Element in the RRC(Connection)ResumeRequest message, which may be transmitted through the MSG3 (during a 4-step RA procedure) or MSG A (during a 2-step RA procedure).

In some embodiments, one ResumeCause may be defined for the 'multi-SIM support request' (UE may transmit the ResumeCause in the RRCResumeRequest message). In some additional embodiments, the UE would use 'mo-signalling' as the ResumeCause in the RRCResumeRequest message.

Please note, in some embodiments, the UE may transmit multi-SIM support request message with the RAN Notification Area Update (RNAU) Request message to the serving cell. In this condition, the ResumeCause may be 'ma-Update'. Based on the same concept, the UE may transmit multi-SIM support request message by RRCResumeRequest message for other purpose (e.g., the ResumeCause may be 'mo-data', 'mo-VoiceCall', 'mo-VideoCall', 'mt-Access').

After receiving the multi-SIM support request message from the UE, the serving cell may reply the 'multi-SIM support response' message to the UE also during (2-step/4-step) RA procedure. The multi-SIM support response message may be delivered as one Information Element in the DL UE specific RRC signaling, such as RRC(Connection)Resume message, RRC(Connection)Reject message, RRC(Connection)Setup message and RRC(Connection)Reconfiguration message.

In some embodiments, the UE may transmit multi-SIM support request through a random access procedure (e.g., 2-step RA procedure/4-step RA procedure).

The UE may stay in RRC Inactive state, and then the UE may transmit the multi-SIM support request message as one Information Element in the RRC(Connection)ResumeComplete message, which may be transmitted through the MSGS during a random access procedure. (e.g., the UE transmits one the busy indicator to the CN through the RRC signaling via the RAN/Base Station/Cell). The busy indicator may be a NAS signaling encapsulated in the RRC signaling.

After receiving the multi-SIM support request message from the UE, the serving cell may reply the multi-SIM support response message to the UE also during (2-step/4-step) RA procedure. In some other embodiments, after receiving the multi-SIM support request message from the UE (e.g., MSGS), the serving cell may reply the multi-SIM support response message to the UE after the (2-step/4-step) RA procedure (e.g., through a RRCReconfiguration message).

In some embodiments, the UE may transmit multi-SIM support request through a random access procedure (e.g., 2-step RA procedure/4-step RA procedure).

The UE may stay in RRC Idle state, and then the UE may transmit the multi-SIM support request message as one Information Element in the RRCSetupRequest message, which may be transmitted through the MSGS during a random access procedure.

In some embodiments, the RRC entity of the UE may receive one indicated EstablishmentCause from the upper layers.

In some embodiments, one EstablishmentCause may be defined for the 'multi-SIM support request' (UE may transmit the EstablishmentCause in the RRCSetupRequest message).

In some other embodiments, the UE would use 'mo-signalling' as the EstablishmentCause in the RRCSetupRequest message.

After receiving the multi-SIM support request message from the UE, the serving cell may reply the multi-SIM support response message to the UE also during (2-step/4-step) RA procedure.

In some embodiments, the UE may transmit multi-SIM support request message to the serving cell (after the UE receiving the multi-SIM support information message from the serving cell). The multi-SIM support request message may be a NAS signaling generated to the concerned target CN. Therefore, after receiving the multi-SIM support request message (encapsulated in the RRC signaling) from the UE, the serving base station may forward the multi-SIM support request message (in NAS signaling) to the CN through backhaul connections (e.g., S1/N1/N2 interface).

In some embodiments, the UE may transmit multi-SIM support request message to the serving cell (based on the stored multi-SIM support information corresponding to the registered/selected NW. In this condition, the UE may not receive the multi-SIM support information to the serving NW). The multi-SIM support request message may be a NAS signaling generated to the concerned target CN. Therefore, after receiving the multi-SIM support request message from the UE, the serving base station may forward the multi-SIM support request message to the CN through backhaul connections (e.g., S1/N1/N2 interface).

In some embodiments, the UE may receive 'multi-SIM support response' from the serving cell (after the UE transmitting the multi-SIM Support request message to the serving cell). The multi-SIM support response may be a NAS signaling generated by the concerned target NW.

In some embodiments, the UE may receive 'multi-SIM support response' from the serving cell (after the UE transmitting the multi-SIM support request message to the serving cell). The multi-SIM support response message may be a AS signaling (e.g., RRC signaling) generated by the serving RAN associated with the target NW.

In some other embodiments, the multi-SIM support response message may be a NAS signaling generated by the serving CN associated with the target NW.

In some additional embodiments, the UE may not receive 'multi-SIM support response' from the serving cell after the UE transmitting the multi-SIM support request message to the target (registered) NW. No 'multi-SIM support response' would be transmitted by the serving cell.

In some embodiments, the proposed multi-SIM support response may be RRCRelease message with/without Suspend Configuration. Then, after receiving the multi-SIM support response message from the serving cell, the UE may move to NR RRC Inactive state or NR RRC Idle state, which depends on whether Suspend configuration is attached in the multi-SIM support response message. If the Suspend configuration is attached in the multi-SIM support response message, the UE may move to NR RRC Inactive state. If the Suspend configuration is not attached in the multi-SIM support response message, the UE may move to NR RRC Idle state. In addition, in this condition, the RAN Notification Area may only be composed by the serving cell, which means the valid 'multi-SIM operation' and the related configurations may only be valid in the serving cell. While leaving the serving cell, the UE may need to come back to the target NW for DL control signaling monitoring again (e.g., by transmitting RRCResumeRequest message with Come Back Indicator/Not Busy Indicator).

In the RRCRelease message, one allocated time period (which the unit of the Time period may be represented by second, millisecond, symbol, mini-slot, slot, subframe, radio frame, (default) paging cycle, and/or DRX cycle) may be configured to the UE to implement 'multi-SIM operation'. For example, after receiving the multi-SIM support request message (e.g., one or more Leave Indicator) from the UE side, the serving cell may deliver one RRCRelease message to the UE, which includes one gap time period, for the UE to switch to the NW_B. In addition, to the UE side, the UE may initiate a timer by setting the value of the Timer equivalent to the gap time period. UE may start to count the timer after the UE moves to RRC Idle/inactive state (e.g., based on whether suspend configuration is provided in the RRCRelease message). Then, after the timer expires, the UE may be triggered/initiated to start RRC Resume procedure or RRC Establishment procedure (depends on whether the UE is staying in RRC Inactive state/RRC Idle state) with the original serving NW. In some embodiments, the UE may (re)start the timer when it receives the paging occasion or the paging message from the NW_B. In some embodiments, the UE may NOT (re)start the timer even when it receives the paging occasion or the paging message from the NW_B. In some embodiments, the UE may stop the timer if a "busy indictor" is transmitted to the original serving NW (e.g., the NW_B).

In some embodiments, the proposed multi-SIM support response may be RRCReconfiguration message. Then, after receiving the multi-SIM support response message from the serving cell, the UE may stay in the (LTE/NR) RRC connected state. In the RRCReconfiguration message, one allocated time period may be configured to the UE to implement 'multi-SIM operation'. For example, after receiving the multi-SIM support request message (e.g., one or more Leave Indicator) from the UE side, the serving cell may deliver one RRCReconfiguration message to the UE, which includes one (measurement/scheduling) gap time period, for the UE to switch to the NW_B. In addition, to the UE side, the UE may initiate a timer by setting the value of the Timer equivalent to the given (measurement/scheduling) gap time period. UE may start to count the timer after the UE switches to the NW_B. Then, after the timer expires, the UE may switch back to the original serving NW (e.g., NW_A). In some embodiments, the UE may (re)start the timer when it receives the paging occasion or the paging message in NW_B. In some embodiments, the UE may NOT (re)start the timer even when it receives the paging occasion or the paging message in NW_B. In some embodiments, the UE may stop the timer if a "busy indictor" is transmitted to the original serving NW.

In the following the signaling design of the multi-SIM support request message would be discussed.

One UE may transmit one leave indicator (/Busy Indicator) to one (or more) of the registered NW(s) (the target NW) of the UE.

In one embodiment, the purpose of leave indicator is to inform the concerned registered NW (e.g., NW_A in FIG. 1) that the UE would move to another NW(s) (e.g., NW_B) and so the UE would not be available to respond to the concerned NW for a time period.

In one embodiment, the purpose of the busy indicator is to inform the concerned registered NW (e.g., NW_B) that the UE would not monitor the paging message of the concerned NW for a time period.

In some embodiments, the value of the time period (for the UE to switch from NW_A to NW_B and back to NW_A or the time period for the UE to switch from NW_B to NW_A and back to NW_B) may be pre-defined by the technical specification or be pre-installed in the UE side (e.g., be pre-installed in the USIM).

Therefore, after receiving the Leave Indicator/Busy indicator, the NW (which may be the Core Network of the concerned NW or the Radio Access Network of the concerned NW) may implicitly know how long in time domain that the UE may not reply the paging message transmitted by the concerned NW. In addition, a counter/timer may be triggered in the target NW (e.g., while the NW receives the multi-SIM support request message from the UE or while the NW transmits multi-SIM support response message to the UE), while the counter/timer is counting/running, the target NW may suspend all of the packets/signaling which need to be transmitted to the UE.

In some embodiments, the UE may start to count the time period after the UE transmitting the Busy Indicator (/Leave Indicator) to the concerned NW successfully. In some additional embodiments, the UE may start to count the time period after the UE receiving the 'multi-SIM support response' message response message from the concerned NW for the Busy Indicator.

In some embodiments, the UE may also provide one suggested time period in the multi-SIM support request message. Then, after receiving the multi-SIM support request message (and so the suggest length of time period for the UE to skip monitoring the target NW), the target NW may approve the suggested time period by sending the multi-SIM support response message (with/without one ACK indication to the suggested time period). In some additional embodiments, the target NW may decide/configure and then transmit the time period, which the UE is enabled to skip monitoring the concerned target NW, in the multi-SIM support response message.

In some conditions, the UE may implement the following embodiments after transmitting the multi-SIM support request message to the target NW.

In some embodiments, the UE may report the not busy indicator/come back indicator to the target (registered/selected) NW (e.g., this serving cell may or may not be the same cell which the UE transmits the busy indicator or the serving cell may or may not be the same cell which the UE transmits come back indicator) if the UE has transmitted the busy indicator/come back indicator to the target NW.

UE would inform the target (registered/selected) NW that the UE would resume (or come back) to monitor the DL signaling (e.g., paging messages (e.g., CN paging messages and/or RAN paging messages) from the target (registered/selected) NW and/or DL data and/or DL RRC signaling). In some embodiments, the target NW for the 'multi-SIM support request' message reception (e.g., the busy indicator/the not busy indicator/'Leave Indicator'/come back indicator) may be Core Network (CN) and/or Radio Access Network (RAN). Then, after receiving the 'multi-SIM support request' message from the UE, the target NW would know that the UE is available to monitor the (RAN/CN) paging messages or other DL control signaling again. Therefore, the target NW may start to generate and transmit the paging messages through the air link. In addition, the RAN/CN may also start to transmit the data packets/control signaling pended in the target CN/RAN after the NW receives the Not Busy Indicator (or ComeBack Indicator) from the UE.

In some embodiments, the registered (or selected) NW may release/delete/remove the pending packets if the target NW has not received the Come Back Indicator (or Not Busy Indicator) from the UE before the counting timer expires. In addition, the registered NW may also release the stored UE AS Context/UE NAS Context if the target NW (target RAN/target CN) has not received the Come Back Indicator (or Not Busy Indicator) from the UE before the counting timer expires.

In some embodiments, UE may further indicate the 'cause value' in the multi-SIM support request message. For example, while the UE transmits leave indicator to the NW_A, the UE may further indicate the cause with the leave indicator.

The cause value associated with multi-SIM support request message may include (at least) one of the following events: (1) Paging message monitoring (to monitor NW_B, in this embodiment). Here, the paging message may be RAN paging or CN paging message. In some additional embodiments, the UE may further indicate what kind of paging message, which the UE needs to address, in the multi-SIM support request message; (2) UE wants to respond to one (CN/RAN) paging message from NW_B; (3) High priority service requirement, such as Mission Critical service, voice service, video service, or Emergency service (to monitor NW_B, in this embodiment); (4) Measurement for cell (re)selection (in the NW_B); (5) Mobile Originated (MO) signaling to the NW_B (e.g., registration/Tracking Area Update/RAN Notification Area Update, check paging cause, 'Busy indication' transmission); (6) System information Update (to the NW_B).

In some embodiments, the UE may further indicate the request time period that the UE may need to leave from the target NW. For example, the UE may transmit one 'Request Time Period' in the multi-SIM support request message (e.g., leave indicator to the NW_A in the FIG. 1). The unit of Request Time period may be represented by second, millisecond, symbol, mini-slot, slot, subframe, radio frame, (default) paging cycle, and/or DRX cycle.

In some embodiments, one 'multi-SIM support request' message (e.g., the busy indicator/the not busy indicator/ 'Leave Indicator'/come back indicator) may further indicate (or be associated with) one specific NW (e.g., the Busy Indicator may be associated with one PLMNidentity or npnidentity explicitly in the 'multi-SIM support request' message).

In some embodiments, one 'multi-SIM support request' message (e.g., the busy indicator/the not busy indicator/ 'Leave Indicator'/come back indicator) may further indicate (or be associated with) one the CN type associated specific NW (e.g., the Busy Indicator may be associated with one PLMNidentity or npnidentity explicitly in the 'multi-SIM support request' message).

In some other embodiments, one 'multi-SIM support request' message may be associated with more than one (registered) NWs of the UE.

In some additional embodiments, the same 'multi-SIM support request' message may be configured to be associated with all or a subset of (registered) NWs of the UE.

Moreover, in some embodiments, different 'multi-SIM support request' information elements may be configured to be transmitted by the UE, wherein one is associated with (registered/selected) PLMNs of the UE and another sequence is associated with (registered/selected) NPNs of the UE.

In some embodiments, there may be default settings to (at least) one NW(s) supported by the cell (or base station). In some embodiments, the default settings include the condition which the NW would not support all (or any subset) of the multi-SIM functionalities in this disclosure. So, in this condition, the base station may need to explicitly indicate (any combinations of) the multi-SIM functionalities supported by the NW.

In some additional embodiments, the default settings include the condition which the NW would support all (or any subset) of the multi-SIM functionalities in this disclosure. In this condition, the base station may need to explicitly indicate which NW does not support multi-SIM functionalities.

The default setting may be expressed in the technical specification/be derived from the stored UE information (e.g., in USIM)/based on the received the multi-SIM support information received from the serving NW or be pre-installed in the hardware in the UE side (e.g., USIM).

In some embodiments, the multi-SIM support request message may be delivered to the registered/selected NW (e.g., New Radio 5G Core (5GC)) as one Non-Access Stratum (NAS) signaling. In this condition, the serving cell may forward the multi-SIM support request message to the CN through Backhaul connection (e.g., through S1/N1/N2 interface between the base station and core network).

In some embodiments, the multi-SIM support request message may be delivered to the serving RAN of the registered NW as one Access Stratum (AS) signaling. In this condition, the serving base station may or may not forward the multi-SIM support request message to the CN through Backhaul connection (e.g., through S1/N1/N2 interface between the base station and core network)

In the following embodiments, how the multi-SIM operation and the UE's RRC state transition affects each other would be discussed.

In this disclosure, the RRC state may be NR RRC state or E-UTRA RRC state. In addition, to different (registered/ selected) NW (e.g., NW_A/NW_B), the UE may have independent RRC state to each (registered/selected) NW respectively.

RRC state transitions: in some embodiments, one UE in (LTE/NR) RRC Inactive state may transition to (LTE/NR) RRC Idle state (or (LTE/NR) RRC Inactive state) directly after the UE transmitting 'multi-SIM support request' message to the serving cell successfully (e.g., after the UE receives the Hybrid Automatic Repeat reQuest (HARQ) Acknowledgement message from the serving cell or the RRC entity of the UE receives ACK response from the lower layers of the UE).

In some additional embodiments, one UE in (LTE/NR) RRC Connected state may transition to (LTE/NR) RRC Idle state (or (LTE/NR) RRC Inactive state) after the UE receiving 'multi-SIM support response' message successfully from the serving cell.

RRC state transitions: in some embodiments, one UE in (LTE/NR) RRC Inactive state may transition to (LTE/NR) RRC Idle state directly after the UE transmitting 'multi-SIM support request' message to the serving cell successfully (e.g., after the UE receives the Hybrid Automatic Repeat reQuest (HARQ) Acknowledgement message from the serving cell or the RRC entity of the UE receives ACK response from the lower layers of the UE).

In some other embodiments, one UE in (LTE/NR) RRC Inactive state may transition to (LTE/NR) RRC Idle state after the UE receiving 'multi-SIM support response' message from the serving cell.

In some embodiments, the UE and the serving NW (e.g., RAN/CN) may store the 'multi-SIM support record' in the UE side and NW side respectively. The 'multi-SIM support record' may only be associated with the concerned target (registered) NW.

The multi-SIM support record may include any combinations of UE AS Context, UE NAS Context, the counting timer triggered by the multi-SIM support request message/ multi-SIM support response message, the UE record of multi-SIM operation (e.g., 'Leave Indicator/Come Back Indicator' or 'Busy Indicator/Not Busy Indicator') transmission in the UE side, NW record of multi-SIM operation (e.g., 'Leave Indicator/Come Back Indicator' or 'Busy Indicator/ Not Busy Indicator') reception in the NW side, In some embodiments, the UE may store the 'multi-SIM support record' while the UE is staying in RRC Inactive state (associated with the target NW). However, the 'multi-SIM support record' may be released if the UE moves from RRC Inactive state to RRC Idle state. In this condition, the UE may need to report the 'multi-SIM support request' message again to the target (registered) NW. This condition may happen while the previous target receiving entity is RAN (while the UE is staying in RRC Inactive state) and the later target receiving entity is CN (after the UE moving to RRC Idle state).

In some other embodiments, the stored 'multi-SIM support record' may not be impacted by the RRC state transitions (e.g., while the UE moves from RRC Inactive state to RRC Idle state). Therefore, the UE may still store the multi-SIM support record after the UE moving from RRC Inactive state to RRC Idle state (with the associated target NW).

In some embodiments, the 'multi-SIM support record' may be released/removed/deleted while the UE moves from RRC Inactive state/RRC Idle state to RRC Connected state (e.g., the UE moves to RRC Connected state through RRC Resume procedure, RRC Setup procedure). In some other embodiments, the 'multi-SIM support record' may not be released/removed/deleted while moves from RRC Inactive/Idle state to RRC Connected state. Moreover, the stored 'multi-SIM support record' may be still valid after the UE moving from RRC Inactive state to RRC Idle state again.

In some embodiments, the 'multi-SIM support record' may be released/removed/deleted in the UE/NW side after the counting timer expires in the corresponding UE/NW.

In some embodiments, the UE may stay in (NR/LTE) RRC Inactive state while the 'multi-SIM support record' is also stored in the UE/NW.

In some embodiments, the UE may need (or may not) to implement cell (re)selection and/or RRC Resume procedure while the UE is under multi-SIM operation. (e.g., after the UE transmits one leave indicator to the NW_A and before the UE transmits one 'Come Back Indicator to the NW_A'/after the UE transmits one the busy indicator to the NW_B and before the UE transmits one the not busy indicator to the NW_B). However, the UE may (or may not) need to implement cell (re)selection procedure for the corresponding NW (e.g., NW_A/NW_B). In addition, the UE may (or may not) need to initiate RRC Resume Request message for an RAN Notification Area Update procedure initiated by the UE while the UE is also implementing the 'multi-SIM operation' with regards to the corresponding NW_A/NW_B). During the RRC Resume procedure, the UE transmits RRCResumeRequest message to a target cell for RNAU request. Then, the target cell may need to find out the Anchor cell, which is the cell that instructs the UE to move to RRC Inactive state (by sending one RRCRelease message with the information element 'SuspendConfig') and maintains the connection between the UE and its registered NW, through the assistance information contained in the RRCResumeRequest message (e.g., through the Resume UE ID contained in the RRCResumeRequest message). Then, after finding out the Anchor cell, the target cell may obtain the UE AS context from the Anchor cell (e.g., via the wired/wireless backhaul connection between the target node (i.e., the base station that configures the target cell) and the Anchor node (i.e., the base station that configures the Anchor cell)). In addition, the target cell may also obtain the stored 'multi-SIM support record' from the Anchor cell during the RNAU procedure.

In some embodiments, the stored 'multi-SIM support record' may only be valid to the Anchor Cell (or the serving cell which receives the multi-SIM support request message or the serving cell which transmits the multi-SIM support response message). Therefore, once the UE finds out that UE leaves the concerned serving cell (Anchor Cell, or the serving cell which receives the multi-SIM support request message, or the serving cell which transmits the multi-SIM support response message), the UE may release the stored 'multi-SIM support record'. In addition, the UE may need to re-start to monitor the concerned NW_A (e.g., the target NW which the UE has transmitted one or more multi-SIM support request message to inform the target NW that the UE would skip monitoring the target NW during a time period) again.

In some embodiments, the UE may stay in (NR/LTE) RRC Idle state while the 'multi-SIM support record' is also stored in the UE/NW.

In some embodiments, the UE may (or may not) need to implement cell (re)selection and/or tracking area update (TAU) procedure while the UE is under multi-SIM operation. For example, after the UE has transmitted one leave indicator to the NW_A or after the UE has transmitted one the busy indicator to the NW_B. However, the UE may (or may not) implement cell (re)selection procedure for the corresponding NW (e.g., NW_A/NW_B). In addition, the UE may (or may not) initiate the RRC Setup procedure by transmitting the RRC Setup Request message for a Tracking Area Update procedure initiated by the UE while the UE is also implementing the 'multi-SIM operation' with regards to the corresponding NW_A/NW_B). During the RRC Setup procedure/RRC establishment procedure, the UE transmits RRCSetupRequest message to a target cell for TAU request.

In some embodiments, the stored 'multi-SIM support record' may only be valid to the new Tracking Area. So, once the UE finds out that UE leaves the original Tracking Area, the UE may release the stored 'multi-SIM support record'.

Please also note, in some additional embodiments, the transmission of come back indicator and the not busy indicator may be triggered by the UE mobility event (e.g., after cell (re)selection procedure, RNAU procedure, TAU procedure).

In some embodiments, the 'multi-SIM support record' may be associated with the registered NW(s) of the UE.

Then, in some embodiments, the UE (e.g., associated with USIM_A) may be instructed to change the operating NW (or change the select NW) by the upper layers (e.g., by NAS signaling) from one original selected PLMN, which is under multi-SIM operation in the UE side. In this condition, the UE may release the 'multi-SIM support record' associated with the original selected PLMN.

In some additional embodiments, the UE may be instructed by the upper layers to switch/move to the SNPN Access Mode. Here, the NW may be either public network (e.g., PLMN) or private network (e.g., SNPN or PNI-NPN).

SNPN Access Mode: Mode of operation wherein UE only selects SNPNs

Therefore, in some embodiments, while the UE moves to the SNPN Access Mode (based on the instructions of the upper layers), the UE may release the stored multi-SIM support record associated with all of the registered/selected PLMNs.

In contrast, in some embodiments, while the UE leaves the SNPN Access Mode, the UE may release the stored multi-SIM support record associated with all of the registered/selected Non-Public NWs.

In addition, the UE may move from RRC Inactive state to RRC Idle state after the switches of SNPN Access Mode.

In some embodiments, one UE may be able to access one registered NWs through one or more RATs (e.g., E-UTRA and/or NR). Therefore, to one registered NW (e.g., PLMN/NPN), the UE may be able to access the NW through E-UTRA or NR. In some conditions, the upper layers in the UE side may change the associated RATs of one (registered) NWs. For example, to one UE in NR RRC Idle state, the AS layer of the UE side may receive the instructions form the upper layers to change the access RAT from NR to E-UTRA (or vice versa). In this condition, the UE may move form NR RRC Idle state to E-UTRA idle state. Then, UE may re-do cell selection/re-selection procedures to re-camp on an E-UTRA Cell.

Therefore, in the following embodiment, how the RAT-change embodiment may cause additional control events would be discussed.

Assumption: The UE is registered to NW_A and NW_B respectively. In addition, the UE may be able to access NW_B through different RATs (e.g., E-UTRA and NR) respectively. Then, the upper layers in the UE side may instruct the UE to access NW_B through NR RAT. In addition, the UE has transmitted one multi-SIM support request message (e.g., one Busy Indicator to NW_B through NR RAN). Therefore, the UE would not monitor the (CN/RAN) paging messages from the NW_B for a (pre-defined) time period. The UE may stay in NR RRC Inactive state or NR RRC Idle state.

To the NW_B, one UE may move from NR RRC Inactive state (or NR RRC Idle state) to E-UTRA RRC Idle state if the upper layers in the UE side instructs the Access RAT associated with NW_B to be changed from NR to E-UTRA. In this condition, the UE may remove/delete/discard the stored 'multi-SIM support record' after the UE moving to E-UTRA RRC Idle state (e.g., because the associated RAT is modified by the upper layers).

To the NW_B, one UE may move from E-UTRA RRC Inactive state (or E-UTRA RRC Idle state) to NR RRC Idle state if the upper layers in the UE side instructs the Access RAT associated with NW_B to be changed from E-UTRA to NR. In this condition, the UE may remove/delete/discard the stored 'multi-SIM support record' after the UE moving to E-UTRA RRC Idle state (e.g., because the associated RAT is modified by the upper layers).

In some additional embodiments, the UE may need to inform the (registered NW) to update the 'multi-SIM support record' stored in the Network side (e.g., the multi-SIM support record stored in the CN).

In one embodiment, after RAT-Change event happens, the UE may send one (or more) 'multi-SIM support request' message to the target NW (e.g., NW_B) to update the 'multi-SIM support record' stored in the NW_B. In one embodiment, the 'multi-SIM support request' message may be transmitted through the newly camped E-UTRA Cell (since the UE switches from NR to E-UTRA to access the NW_B). In this condition, the UE may deliver the 'multi-SIM support request' message to the serving E-UTRA serving cell through a NAS signaling (e.g., a NAS signaling may be transmitted through Signaling Radio Bearer (SRB), such as SRB1/SRB2/SRB3 to the serving cell. Then, the serving cell may forward the 'multi-SIM support request' message to the CN).

In one embodiment, after receiving the 'multi-SIM support request' message from the UE, the CN may reply 'multi-SIM support response' message to the UE (e.g., through NAS signaling).

In some additional embodiments, the UE may or may not inform the target NW (through the new associated RAT) that 'multi-SIM support record' is released.

In one embodiment, the CN in this embodiment may be Five Generation Core (5GC) network or Evolved Packet Core (EPC). In some additional embodiments, the proposed mechanisms may be applicable only to 5GC.

For extension, the UE may release/remove/delete the stored multi-SIM support record (and then stop the ongoing multi-SIM operation to the concerned target NW) after the UE implementing inter-RAT RRC state transitions (e.g., from NR RRC Inactive state to E-UTRA RRC Idle state) to the same target MW.

In some embodiments, the 'multi-SIM support record' stored in the UE side/NW side may not impacted by the RAT-Change event. This may be because the 'multi-SIM support record' is stored in the NAS-level signaling (protocols). Therefore, the 'multi-SIM support record' may not be impacted by the change in the associated RAT in the same target NW (e.g., while the multi-SIM support record is stored in the NAS entity in the UE side).

In some embodiments, the UE may change both the RAT and associated CN in one 'multi-SIM support request' message to the serving Network (e.g., while the associated RAT and CN is modified by the NAS layer).

In summary, the embodiments of the disclosure propose some mechanisms to address the following issues: (1) How multi-SIM operation is supported while RAN sharing is implemented in the RAN; (2) Signaling design for multi-SIM operation; and (3) related design has been proposed to consider the impact of RRC states to the multi-SIM operations.

The embodiments of the disclosure would be associated with one target NW (e.g., NW_A or NW_B in FIG. 1). Therefore, in some embodiments, the proposed design/configuration associated with one target NW may be released/stopped/removed/discarded if the UE re-selects to another NW or if the UE de-registers to the target NW (with respective to the same USIM). In some other embodiments, one fixed life-time period ($T_L$) may be pre-configured to the UE (with respective to the same USIM). To each multi-SIM operation, the UE may keep the configuration as long as $T_L$. Therefore, the UE may start a new timer and set the initial value of the timer=$T_L$ while a new multi-SIM operation is applied (to one associated NW and one associated USIM). Then, the UE may start to count the timer to zero. The UE may keep the multi-SIM operation while the timer is still counting and no new multi-SIM operation/configuration (to the same associated NW and the same associated USIM) is provided/configured to the UE. In one embodiment, after the timer expires, the UE may automatically remove the stored multi-SIM record/stop the on-going multi-SIM operation. In contrast, the timer may be reset to $T_L$ and then be re-started if the UE is configured to implement an updated multi-SIM operation/multi-SIM configuration (to the same associated NW and the same associated USIM).

Furthermore, in some embodiments, the counting timer may be stopped if the UE (e.g., the upper layer) instructs to stop the multi-SIM operation (with one associated with one NW and one associated USIM). Therefore, in some embodiments, one NW may be configured with one specific timer (with respective to one USIM). Then, to one UE side, the timers of each selected/registered NW (e.g., NW_A/NW_B) (or each USIM) may be set/reset/counted independently. Moreover, the timer may be stopped/released/removed/discarded if the UE re-select/de-register to another NW (with respective to one USIM stored in the UE side).

Figure 4:
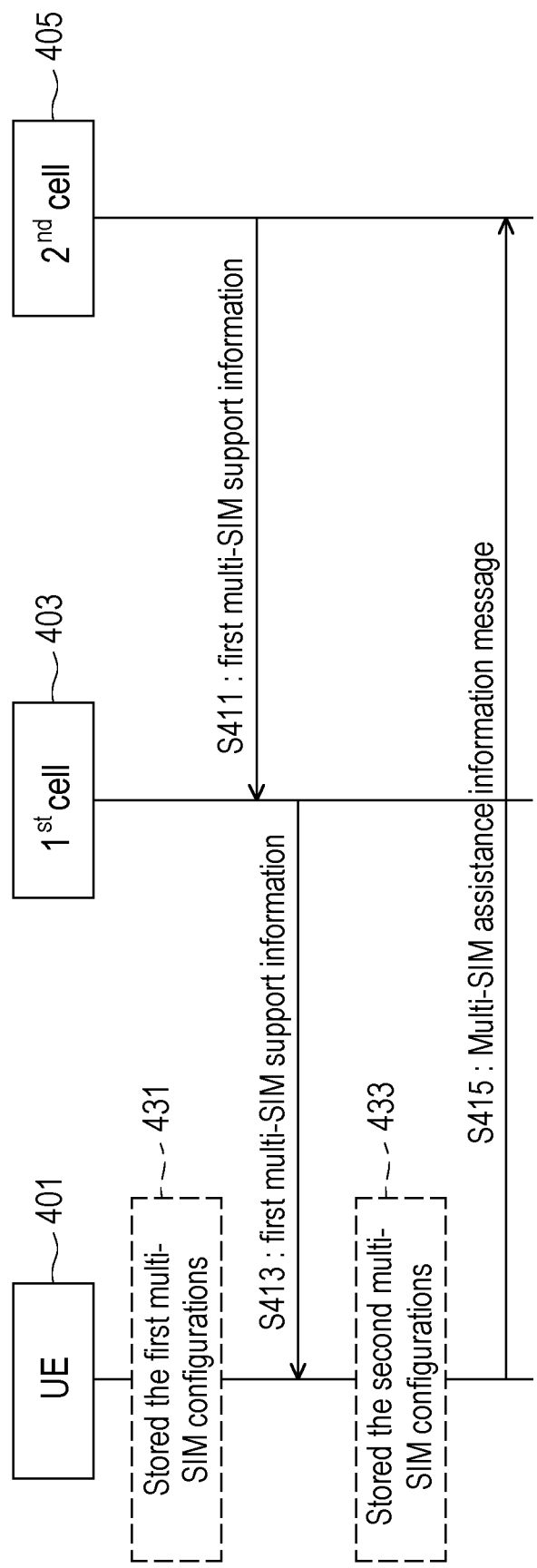
FIG. 4 shows a signaling chart of the method for UE to update/modify the stored multi-SIM configuration according to an embodiment of the disclosure.

FIG. 4 shows a signaling chart of the method for UE to update/modify the stored multi-SIM configuration according to an embodiment of the disclosure.

In some embodiments, the UE (e.g., UE 401) may receive, at the step S413, a first multi-SIM support information from a first cell (e.g., the $1^{st}$ cell 403), wherein the first multi-SIM support information is generated and transmitted from a second cell (e.g., the $2^{nd}$ cell 405) to the first cell via an inter-node signaling from the second cell to the first cell (e.g., via the backhaul connection, as shown in step S411), and the first cell and the second cell belong to a first network;

Then, as shown at step S415, the UE 401 may transmit a multi-SIM assistance information message to the second cell, wherein the multi-SIM assistance information message is determined based on the first multi-SIM support information received at the step S413. In some embodiments, the UE may have stored a plurality of first multi-SIM configurations, as shown in the block 431, before the UE receives the first multi-SIM support information at the step S413. In some additional embodiments, the first multi-SIM support information may further include a release indicator that instructs the UE to release the plurality of first multi-SIM configurations. Then, after receiving the release indicator at the step S413, the UE may release the plurality of first multi-SIM configurations in response to the release indicator. In some additional embodiments, the UE 401 may stop (and/or release) a running Leave Timer after the UE releases the plurality of first multi-SIM configurations, wherein an initial value of the running Leave Timer is determined based on a first leave WithoutResponseTimer in the plurality of first multi-SIM configurations. The Leave Timer may be triggered to count to zero by the UE when the UE reports to the first cell that the UE wants to Leave the first NW (e.g., before the step S413).

In some embodiments, the plurality of first multi-SIM configurations as shown in block 431 may further include a plurality of multi-SIM gap configurations for the UE 401 to temporarily switch to another network (e.g., the second network) to communicate with the second network during a multi-SIM gap time period, which is decided by the UE 401 based on any combinations of the plurality of multi-SIM gap configurations. During the multi-SIM gap time period, the UE 401 can communicate with the second network and still keep the (RRC/core network) connection with the first network. In this condition, the UE 401 may stop applying the multi-SIM gap configurations (associated with the first multi-SIM configurations) after the UE releases the plurality of first multi-SIM configurations. In addition, the multi-SIM gap time period may also be stopped after the UE releases the plurality of first multi-SIM configurations. In some embodiments, the communication between the UE 401 and the second network may be interrupted/released/dropped when the UE 401 stop applying the multi-SIM gap configurations when the UE releases the plurality of first multi-SIM configurations (and so the multi-SIM gap configurations) and stops the multi-SIM gap time period.

In some other embodiments, the first multi-SIM support information may further include a plurality of second multi-SIM configurations. In this condition, the UE 401 may overwrite the plurality of first multi-SIM configurations, as shown in the block 431, with the plurality of second multi-SIM configurations (as shown in block 433), wherein the plurality of first multi-SIM configurations may be configured by the first cell and stored by the UE before the UE receives the first multi-SIM support information. In some additional embodiments, the UE 401 may stop and/or release a running Leave Timer after the UE overwrites the plurality of first multi-SIM configurations, as shown in the block 431, with the plurality of second multi-SIM configurations. The Leave Timer may be triggered to count to zero by the UE when the UE reports to the first cell that the UE wants to Leave the first NW (e.g., before the step S413).

In some embodiments, the plurality of first multi-SIM configurations as shown in block 431 may further include a plurality of first multi-SIM gap configurations for the UE 401 to temporarily switch to another network (e.g., a second network) to communicate with the second network during a first multi-SIM gap time period, which is decided by the UE 401 based on any combinations of the plurality of first multi-SIM gap configurations. During the first multi-SIM gap time period, the UE 401 can communicate with the second network and still keep the (RRC/core network) connection with the first network. In this condition, the UE 401 may stop applying the plurality of first multi-SIM gap configurations (associated with the plurality of first multi-SIM configurations) after the UE overwrites the plurality of first multi-SIM configurations by the plurality of second multi-SIM configurations (received by the UE 401 at the step S413). In addition, the first multi-SIM gap time period may also be stopped after the UE overwrites the plurality of first multi-SIM configurations by the plurality of second multi-SIM configurations. In some additional embodiments, the communication between the UE 401 and the second network may be interrupted/released/dropped when the UE 401 stops the first multi-SIM gap time period.

In some embodiments, the plurality of second multi-SIM configurations, which are received by the UE 401 at the step S413, may further include a second leave WithoutResponseTimer. So, after receiving the second leave WithoutResponseTimer at the step S413, the UE 401 may transmit a leave indicator to the second cell to inform that the UE intends to leave the first network. The UE 401 may transmit the leave indicator to the $2^{nd}$ cell 405 via the Multi-SIM assistance information message, as shown at the step S415. In some additional embodiments, the UE may start to count a Leave Timer, wherein the initial value of the Leave Timer is determined based on the second leave WithoutResponseTimer, after the UE transmitting the leave indicator to the $2^{nd}$ cell 405 at the step S415. In addition, the UE may release the radio resource control connection with the second cell (and so the first network) after the Leave Timer expires.

In some embodiments, the plurality of second multi-SIM configurations may further include a plurality of second multi-SIM gap configurations. In addition, the UE may derive a second multi-SIM gap time period based on the any combinations of the plurality of second multi-SIM gap configurations. In addition, the UE may switch form the first network to communicate with a second network during the second multi-SIM gap time period after the UE overwrites the plurality of first multi-SIM configurations by the plurality of second multi-SIM configurations.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for maintaining multi-SIM (Subscriber Identity Module) configuration, adapted to user equipment (UE), comprising:
    receiving, by the UE, a first multi-SIM support information from a first cell, wherein the first multi-SIM support information is generated and transmitted from a second cell to the first cell via an inter-node signaling from the second cell to the first cell, and the first cell and the second cell belong to a first network;
    transmitting, by the UE, a multi-SIM assistance information message, wherein the multi-SIM assistance information message is determined based on the first multi-SIM support information.

2. The method according to claim 1, wherein the first multi-SIM support information comprises a release indicator that instructs the UE to release a plurality of first multi-SIM configurations, which are configured by the first cell and stored by the UE before the UE receives the first multi-SIM support information, and the method further comprises:
    releasing, by the UE, the plurality of first multi-SIM configurations in response to the release indicator.

3. The method according to claim 1, wherein the first multi-SIM support information comprises a plurality of second multi-SIM configurations, and the method further comprises:
    overwriting, by the UE, a plurality of first multi-SIM configurations with the plurality of second multi-SIM configurations, wherein the plurality of first multi-SIM configurations are configured by the first cell and stored by the UE before the UE receives the first multi-SIM support information.

4. The method according to claim 2, further comprising:
    stopping, by the UE, a running Leave Timer after the UE releases the plurality of first multi-SIM configurations, wherein an initial value of the running Leave Timer is determined based on a first leave WithoutResponseTimer in the plurality of first multi-SIM configurations.

5. The method according to claim 3, further comprising:
    stopping, by the UE, a running Leave Timer after the UE overwrites the plurality of first multi-SIM configurations, wherein an initial value of the running leave timer is determined based on a first leave WithoutResponseTimer in the plurality of first multi-SIM configurations.

6. The method according to claim 2, wherein the plurality of first multi-SIM configurations comprises a plurality of multi-SIM gap configurations, and the method further comprises:
    stopping, by the UE, applying the plurality of multi-SIM gap configurations after the UE releases the plurality of first multi-SIM configurations, wherein the plurality of multi-SIM gap configurations are used for the UE to switch to communicate with a second network during a multi-SIM gap time period decided by the UE based on the plurality of multi-SIM gap configuration.

7. The method according to claim 3, wherein the plurality of first multi-SIM configurations comprise a plurality of first multi-SIM gap configurations, and the method further comprises:
    stopping, by the UE, applying a first multi-SIM gap time period, which is determined by the UE based on the plurality of first multi-SIM gap configurations to communicate with a second network during the first multi-SIM gap time period, after the UE overwrites the plurality of first multi-SIM configurations.

8. The method according to claim 3, wherein the plurality of second multi-SIM configurations comprises a second leaveWithoutResponseTimer, and the method further comprises:
    transmitting, by the UE, a leave indicator to the second cell, wherein the leave indicator informs the second cell that the UE intends to leave the first network; and
    starting, by the UE, counting a Leave Timer, wherein an initial value of the Leave Timer is determined based on the second leave WithoutResponseTimer, and
    releasing, a radio resource control (RRC) connection with the second cell after the Leave Timer expires.

9. The method according to claim 3, wherein the plurality of second multi-SIM configurations comprise a plurality of second multi-SIM gap configurations, and the method further comprises:
    receiving, by the UE, the plurality of second multi-SIM configurations; and
    switching, by the UE, from the first network to communicate with a second network during a second multi-SIM gap time period determined by any combinations of the plurality of second multi-SIM gap configurations, after the UE overwrites the plurality of first multi-SIM configurations.

10. The method according to claim 1, wherein the first network is a New Radio (NR) cellular network, which is a Public Land Mobile Network (PLMN), Standalone Non-public Network (SNPN), or a Public network integrated Non-Public Network.

11. A user equipment, comprising:
    a transceiver; and
    a processor, coupled to the transceiver and configured to perform:
        controlling the transceiver to receive a first multi-SIM support information from a first cell, wherein the first multi-SIM support information is generated and transmitted from a second cell to the first cell via an inter-node signaling from the second cell to the first cell, and the first cell and the second cell belong to a first network;
        controlling the transceiver to transmit a multi-SIM assistance information message, wherein the multi-SIM assistance information message is determined based on the first multi-SIM support information.

12. The UE according to claim 11, wherein the first multi-SIM support information comprises a release indicator that instructs the UE to release a plurality of first multi-SIM configurations, which are configured by the first cell and stored by the UE before the UE receives the first multi-SIM support information, and the processor further performs:
    releasing the plurality of first multi-SIM configurations in response to the release indicator.

13. The UE according to claim 11, wherein the first multi-SIM support information comprises a plurality of second multi-SIM configurations, and the processor further performs:
    overwriting a plurality of first multi-SIM configurations with the plurality of second multi-SIM configurations, wherein the plurality of first multi-SIM configurations are configured by the first cell and stored by the UE before the UE receives the first multi-SIM support information.

14. The UE according to claim 12, wherein the processor further performs:
    stopping a running Leave Timer after the UE releases the plurality of first multi-SIM configurations, wherein an initial value of the running Leave Timer is determined based on a first leaveWithoutResponseTimer in the plurality of first multi-SIM configurations.

15. The UE according to claim 13, wherein the processor further performs:
    stopping a running Leave Timer after the UE overwrites the plurality of first multi-SIM configurations, wherein an initial value of the running Leave timer is determined based on a first leaveWithoutResponseTimer in the plurality of first multi-SIM configurations.

16. The UE according to claim 12, wherein the plurality of first multi-SIM configurations comprises a plurality of multi-SIM gap configurations, and the processor further performs:
stopping applying the plurality of multi-SIM gap configurations after the UE releases the plurality of first multi-SIM configurations, wherein the plurality of multi-SIM gap configurations are used for the UE to switch to communicate with a second network during a multi-SIM gap time period decided by the UE based on the plurality of multi-SIM gap configuration.

17. The UE according to claim 13, wherein the plurality of first multi-SIM configurations comprise a plurality of first a multi-SIM gap configurations, and the processor further performs:
stopping applying a first multi-SIM gap time period, which is determined by the UE based on the plurality of first multi-SIM gap configurations to communicate with a second network during the first multi-SIM gap time period, after the UE overwrites the plurality of first multi-SIM configurations.

18. The UE according to claim 13, wherein the plurality of second multi-SIM configurations comprises a second leaveWithoutResponseTimer, and the processor further performs:
controlling the transceiver to transmit a leave indicator to the second cell, wherein the leave indicator informs the second cell that the UE intends to leave the first network; and
starting counting a Leave Timer, wherein an initial value of the Leave Timer is determined based on the second leave WithoutResponseTimer, and
releasing, a radio resource control (RRC) connection with the second cell after the Leave Timer expires.

19. The UE according to claim 13, wherein the plurality of second multi-SIM configurations comprise a plurality of second multi-SIM gap configurations, and the processor further performs at least one of following actions:
controlling the transceiver to receive the plurality of second multi-SIM configurations; and
switching from the first network to communicate with a second network during a second multi-SIM gap time period determined by any combinations of the plurality of second multi-SIM gap configurations, after the UE overwrites the plurality of first multi-SIM configurations.

20. The UE according to claim 11, wherein the first network is a New Radio (NR) cellular network, which is a Public Land Mobile Network (PLMN), Standalone Non-public Network (SNPN), or a Public network integrated Non-Public Network.

21. A communication system, comprising:
a first network node, performing:
receiving an inter-node signaling from a second network node, wherein the inter-node signaling comprises a first multi-SIM support information, and the first network node and the second network node belong to a first network;
transmitting the first multi-SIM support information to user equipment (UE);
UE, coupled with the first network node and performing:
receiving the first multi-SIM support information from the first network node.

22. The communication system according to claim 21, wherein the UE transmits a multi-SIM assistance information message, wherein the multi-SIM assistance information message is determined based on the first multi-SIM support information.

23. The communication system according to claim 21, wherein the first network node is a serving base station of the UE.

24. The communication system according to claim 21, wherein the second network node is a base station and the inter-node signaling is transmitted via an X2 interface or an Xn interface between the first network node and the second network node.

25. The communication system according to claim 21, wherein the second network node is a core network, wherein the core network comprises an Evolved Packet Core (EPC) or a fifth-generation (5G) core, and the inter-node signaling is transmitted via a backhaul connection between the core network and the first network node.

* * * * *